(12) United States Patent
Kitaya

(10) Patent No.: US 12,002,437 B2
(45) Date of Patent: Jun. 4, 2024

(54) DISPLAY CONTROL APPARATUS AND CONTROL METHOD THEREFOR

(71) Applicant: CANON KABUSHIKI KAISHA, Tokyp (JP)

(72) Inventor: Koki Kitaya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/089,148

(22) Filed: Nov. 4, 2020

(65) Prior Publication Data

US 2021/0166658 A1 Jun. 3, 2021

(30) Foreign Application Priority Data

Nov. 29, 2019 (JP) ................................. 2019-217581

(51) Int. Cl.
| G09G 5/37 | (2006.01) |
| G06F 3/0488 | (2022.01) |
| H04N 23/63 | (2023.01) |

(52) U.S. Cl.
CPC ............ *G09G 5/37* (2013.01); *G06F 3/0488* (2013.01); *G09G 2354/00* (2013.01); *H04N 23/632* (2023.01); *H04N 23/635* (2023.01)

(58) Field of Classification Search
CPC ..... G06T 11/60; G06T 15/50; G06F 3/04847; G06F 3/0488; G06F 3/147; G09G 2354/00; G09G 5/37; H01M 10/126; H01M 50/116; H01M 50/543; H04N 5/2251; H04N 5/232; H04N 5/23216; H04N 5/23245; H04N 5/232935; H04N 5/232945
See application file for complete search history.

(56) References Cited

U.S. PATENT DOCUMENTS

| 2004/0114796 A1* | 6/2004 | Kaku ....................... G06T 7/90 |
| | | 382/165 |
| 2006/0010099 A1* | 1/2006 | Takeda ................ G06F 3/04892 |
| 2016/0366323 A1 | 12/2016 | Chan et al. |
| 2019/0116311 A1* | 4/2019 | Sato ................. H04N 5/232935 |
| 2019/0191101 A1* | 6/2019 | Ogawa .................... G03B 13/36 |
| 2019/0208114 A1* | 7/2019 | Ginat ................... H04N 19/102 |

FOREIGN PATENT DOCUMENTS

| CN | 101115139 A | 1/2008 |
| CN | 104427237 A | 3/2015 |
| CN | 104838313 A | 8/2015 |
| CN | 107770454 A | 3/2018 |
| CN | 109644239 A | 4/2019 |
| CN | 109688341 A | 4/2019 |
| JP | 2018-010496 A | 1/2018 |

OTHER PUBLICATIONS

Machine translation of JP2018010496 (Year: 2018).*

* cited by examiner

*Primary Examiner* — Sing-Wai Wu
(74) *Attorney, Agent, or Firm* — Canon U.S.A., Inc. IP Division

(57) ABSTRACT

A display control apparatus includes a change unit configured to change amount of application of a predetermined effect which is to be applied to a selected subject from a plurality of subjects, and a control unit configured to perform control to display a first item which makes the selected subject distinguishable from other subjects, wherein, in response to the change unit starting changing amount of application of the predetermined effect, the control unit performs control not to display the first item.

9 Claims, 19 Drawing Sheets

RAW IMAGE DEVELOPMENT MENU

RELIGHTING

DEGREE OF CLARITY  *601*

*602*

RAW IMAGE DEVELOPMENT MENU SCREEN

FIG.6B *603*

*604* IMAGE SELECTION SCREEN

IMAGE SELECTION SCREEN

FIG.6E  *615*  *614*

*611* SETTING SCREEN  *609*

FIG.6F *617*

SETTING SCREEN (AT THE TIME OF SCREEN TAP)

SETTING SCREEN

SETTING SCREEN

FACE SELECTION SCREEN

FACE SELECTION SCREEN
(AFTER FACE CHANGE)

CHANGING OF VIRTUAL LIGHT SOURCE DIRECTION BY TOUCH

MOVEMENT OF ITEM AFTER ARRIVAL AT OUTER CIRCUMFERENCE

EXAMPLE OF ILLUMINATING A FACE LOCATED AT SCREEN END FROM OUTSIDE

REGION SEGMENTATION FOR ITEM

MOVEMENT OF ITEM INDICATING CURRENT POSITION ALONG CIRCUMFERENCE

MODIFICATION EXAMPLE OF
ADVANCED SETTING DISPLAY

DISPLAY CONTROL APPARATUS AND CONTROL METHOD THEREFOR

BACKGROUND

Field of the Disclosure

Aspects of the present disclosure generally relate to a display control apparatus and a control method therefor and, in particular, to a technique used for applying an effect to an image.

Description of the Related Art

There is image processing for applying, to a subject included in a captured image, such an effect as if the subject were illuminated with light coming from an imaginary light source (hereinafter referred to as a "virtual light source"). Japanese Patent Application Laid-Open No. 2018-10496 discusses a touch operation on a screen enabling changing the illumination direction of a virtual light source with respect to a main subject.

SUMMARY

Embodiments of the present disclosure are generally directed to providing a display control apparatus which facilitates a user to recognize a subject to which an effect is to be applied in an image.

According to embodiments of the present disclosure, a display control apparatus includes a change unit configured to change amount of application of a predetermined effect which is to be applied to a selected subject from a plurality of subjects, and a control unit configured to perform control to display a first item which makes the selected subject distinguishable from other subjects, wherein, in response to the change unit starting changing amount of application of the predetermined effect, the control unit performs control not to display the first item.

Further features of the present disclosure will become apparent from the following description of exemplary embodiments with reference to the attached drawings.

BRIEF DESCRIPTION OF THE DRAWINGS

FIGS. 6A, 6B, 6C, 6D, 6E, 6F, 6G, 6H, 6I, and 6J are diagrams illustrating examples of display screens in the present exemplary embodiment.

DESCRIPTION OF THE EMBODIMENTS

Various exemplary embodiments, features, and aspects of the disclosure will be described in detail below with reference to the drawings.

Figure 1A:
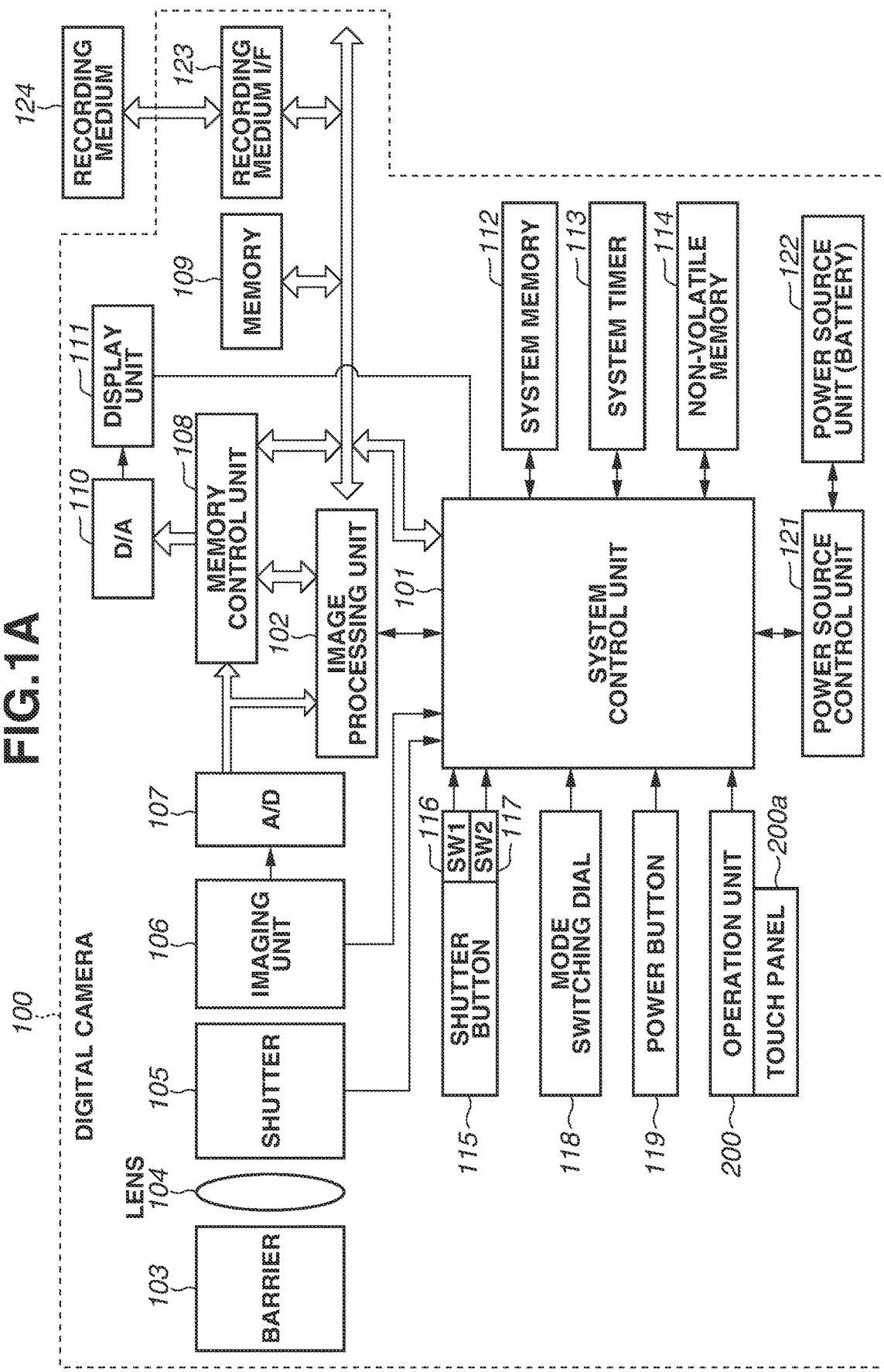
FIG. 1A is a block diagram of a digital camera serving as an apparatus to which an exemplary embodiment of the present disclosure is applicable.
Figure 1B:
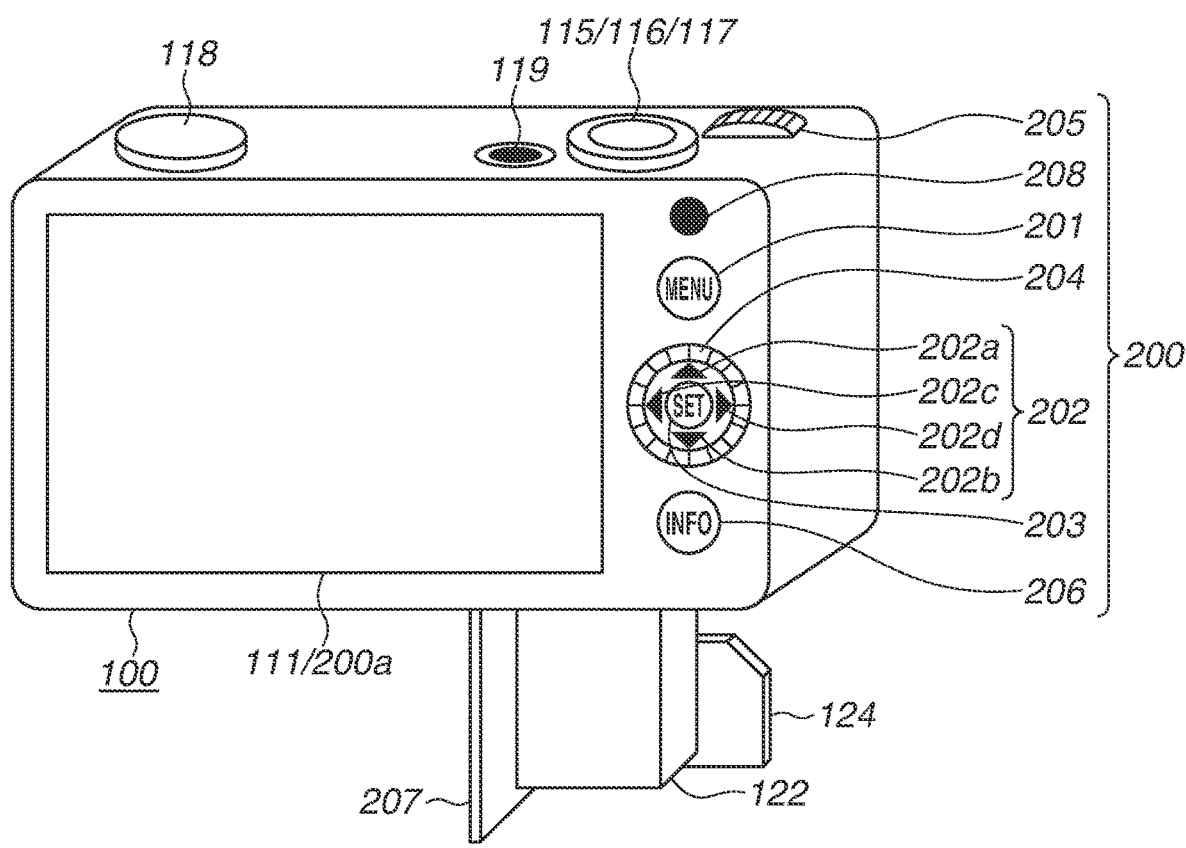
FIG. 1B is an appearance diagram of the digital camera serving as an apparatus to which the exemplary embodiment of the present disclosure is applicable.

FIG. 1A is a block diagram illustrating a system configuration example of a digital camera 100 serving as an example of an apparatus to which an exemplary embodiment of the present disclosure is applicable. FIG. 1B is an appearance diagram of the digital camera 100.

Referring to FIGS. 1A and 1B, an image capturing lens 104 is a lens group including a zoom lens and a focus lens. A shutter 105 is a shutter having an aperture adjustment function. An imaging unit 106 is an image sensor composed of, for example, a charge-coupled device (CCD) element or a complementary metal-oxide semiconductor (CMOS) element, which converts an optical image into an electrical signal. An analog-to-digital (A/D) converter 107 converts an analog signal into a digital signal. The A/D converter 107 is used to convert an analog signal output from the imaging unit 106 into a digital signal. A barrier 103 is configured to cover an image capturing system including the image capturing lens 104 of the digital camera 100, thus preventing contamination and breakage of an image capturing system including the image capturing lens 104, the shutter 105, and the imaging unit 106.

An image processing unit 102 performs predetermined pixel interpolation, resizing processing such as reduction, and color conversion processing on the data output from the A/D converter 107 or data read out from a memory control unit 108. Moreover, the image processing unit 102 performs predetermined calculation processing using the captured image data, and a system control unit 101 performs exposure control and distance measurement control based on a calculation result obtained by the image processing unit 102. With this, autofocus (AF) processing of the through-the-lens (TTL) type, automatic exposure (AE) processing, and electronic flash (EF) (flash preliminary light emission) processing are performed. The image processing unit 102 further performs predetermined calculation processing using the captured image data, and performs automatic white balance (AWB) processing of the TTL type based on the obtained calculation result.

Data output from the A/D converter 107 is then written in a memory 109 via the image processing unit 102 and the memory control unit 108 or directly via the memory control unit 108 without via the image processing unit 102. The memory 109 stores image data acquired by the imaging unit 106 and converted into digital data by the A/D converter 107 or image data that is to be displayed on a display unit 111. The memory 109 has a storage capacity sufficient to store a predetermined number of still images or a moving image and sound taken for a predetermined time.

Moreover, the memory 109 also serves as a memory for image display (video memory). A digital-to-analog (D/A) converter 110 converts data for image display stored in the memory 109 into an analog signal and supplies the analog signal to the display unit 111. In this way, image data for display stored in the memory 109 is then displayed on the display unit 111 via the D/A converter 110.

The display unit 111 performs display corresponding to the analog signal supplied from the D/A converter 110 on a display device, such as a liquid crystal display (LCD). A digital signal obtained by A/D conversion performed once by the A/D converter 107 and stored in the memory 109 is then converted into an analog signal by the D/A converter 110, and the analog signal is then sequentially transferred to the display unit 111 and displayed thereon, so that the function of an electronic viewfinder is implemented, thus enabling performing through-image display. Hereinafter, an image which is displayed by through-image display is referred to as a "live view image".

A non-volatile memory 114 is an electrically erasable and recordable memory, for which, for example, an electrically erasable programmable read-only memory (EEPROM) is used. For example, constants and a program for operations of the system control unit 101 are stored in the non-volatile memory 114. The program as used herein is a computer program which is executed to implement various flowcharts described below in the present exemplary embodiment.

The system control unit 101 controls the entire digital camera 100. The system control unit 101 implements various processing operations in the present exemplary embodiment by executing the above-mentioned program recorded on the non-volatile memory 114. A system memory 112 includes, for example, a random access memory (RAM). The system memory 112 is used to load, thereon, for example, constants and variables for operations of the system control unit 101 and a program read out from the non-volatile memory 114. Moreover, the system control unit 101 also performs display control by controlling, for example, the memory 109, the D/A converter 110, and the display unit 111. A system timer 113 is a timer unit which measures times for use in various control operations and time in a built-in clock.

A shutter button 115, a mode switching dial 118, a power button 119, and an operation unit 200 constitute an operation unit configured to input various operation instructions to the system control unit 101, so that the system control unit 101 is able to detect that an operation has been performed on the operation unit 200.

The mode switching dial 118 is configured to switch the operation mode of the system control unit 101 between a still image recording mode, a moving image recording mode, a playback mode, and detailed modes included in each operation mode.

A first shutter switch 116 is configured to be turned on in response to a halfway operation, in other words, a half-pressed state, of the shutter button 115 of the digital camera 100 (an image capturing preparation instruction), thus generating a first shutter switch signal SW1. In response to the first shutter switch signal SW1, the system control unit 101 starts operations, such as autofocus (AF) processing, automatic exposure (AE) processing, automatic white balance (AWB) processing, and flash preliminary emission (EF) processing.

A second shutter switch 117 is configured to be turned on in response to a complete operation, in other words, a fully-pressed state, of the shutter button 61151 (an image capturing instruction), thus generating a second shutter switch signal SW2. In response to the second shutter switch signal SW2, the system control unit 101 starts a series of image capturing processing operations starting with a signal readout operation from the imaging unit 106 and leading to a writing operation for image data to a recording medium 124.

A power source control unit 121 is configured with, for example, a battery detection circuit, a direct-current (DC)-DC converter, and a switch circuit for switching blocks to be energized, and detects the state of the power button 119, the presence or absence of attachment of a battery, the type of a battery, and the remaining amount of battery power. Moreover, the power source control unit 121 controls the DC-DC converter based on a result of such detection and an instruction from the system control unit 101, and supplies required voltages to various portions, including the recording medium 124, for respective required periods.

A power source unit 122 includes, for example, a primary battery, such as an alkaline battery or a lithium battery, a secondary battery, such as a nickel-cadmium (NiCd) battery, a nickel-metal hydride (NiMH) battery, or a lithium (Li) battery, or an alternating current (AC) adapter. In the description of the present exemplary embodiment, a secondary battery is used as the power source unit 122 (hereinafter referred to as a "battery 122").

A recording medium interface (I/F) 123 is an interface with the recording medium 124, such as a memory card or a hard disk. The recording medium 124 is a recording medium, such as a memory card, which is used to record an image at the time of image capturing, and is configured with, for example, a semiconductor memory or a magnetic disc.

Various operation members of the operation unit 200 are assigned the respective functions for each situation as appropriate with various function icons displayed on the display unit 111 being selected and operated, and thus act as various function buttons. The function buttons include, for example, an end button, a back button, an image feeding button, a jump button, a stop-down button, and an attribute changing button. For example, the operation unit 200 includes a touch panel 200a, a menu button 201, a multi-controller 208, four-way arrow buttons 202, and a SET button 203. Additionally, the operation unit 200 further includes, for example, a controller wheel 204, an electronic dial 205, and an INFO button 206. The four-way arrow buttons 202 include an up key 202a for upward direction, a down key 202b for downward direction, a left key 202c for leftward direction, and a right key 202d for rightward direction, and are able to be used to, for example, move an item which is currently selected or change an item to be selected. For example, when the menu button 201 illustrated in FIG. 1B is pressed, a menu screen available for various settings is displayed on the display unit 111. The user is allowed to intuitively perform various settings with use of the menu screen displayed on the display unit 111, the four-way arrow buttons 202, which include buttons for four, upward, downward, leftward, and rightward, directions, and the SET button 203. The controller wheel 204, the electronic dial 205, and the multi-controller 208 are rotationally-operable operation members included in the operation unit 200, and are used to issue an instruction for selecting an item together with direction buttons. When the user rotationally operates the controller wheel 204 or the electronic dial 205, an electrical pulse signal corresponding to the amount of operation is generated and the system control unit 101 controls respective units of the digital camera 100 based on the generated pulse signal. The system control unit 101 is able to determine, for example, the angle by which the controller wheel 204 or the electronic dial 205 has been rotationally operated or how many rotations which the controller wheel 204 or the electronic dial 205 has made, based on the generated pulse signal. Furthermore, the controller wheel 204 or the electronic dial 205 can be any type of operation member as long as a rotational operation thereof is able to be detected. For example, the controller wheel 204 or the electronic dial 205 can be a dial operation member which generates a pulse signal by the controller wheel 204 or the electronic dial 205 itself rotating according to a rotational operation performed by the user. Moreover, the controller wheel 204 can be an operation member composed of a touch sensor, so that the controller wheel 204 itself does not rotate and, for example, a rotational action of the finger of the user on the controller wheel 204 is detected (what is called a touch wheel). The multi-controller 208 is a controller which is able to issue an instruction for rightward direction, leftward direction, upward direction, and downward direction, as with the four-way arrow buttons 202, and a lever thereof is able to be tilted in each direction to issue an instruction for each direction. The INFO button 206 is a button used to switch the amount of information used for information display displayed on the display unit 111. Each time the INFO button 206 is pressed, the amount of information is sequentially switched in the order of standard, detail, and non-display.

The digital camera 100 allows the battery 122 and the recording medium 124 to be inserted thereinto through the bottom surface thereof, and the bottom surface thereof is covered with a cover 207 which is openable and closable.

One of members of the operation unit 200 is the touch panel 200a, which is capable of detecting contact with the display unit 111. The touch panel 200a and the display unit 111 can be configured in an integrated manner. For example, the touch panel 200a is configured to have such a light transmittance as not to hinder displaying performed by the display unit 111, and is attached to the upper layer of a display surface of the display unit 111. Then, the input coordinates in the touch panel 200a are associated with the display coordinates on a display screen of the display unit 111. With this, a graphical user interface (GUI) can be configured as if the user were allowed to directly operate a screen displayed on the display unit 111. The system control unit 101 is able to detect the following operations performed on the touch panel 200a or states thereof (i.e., is able to perform touch detection):
  the state in which a finger or pen, which has not been touching the touch panel 200a, has newly touched the touch panel 200a, in other words, starting of a touch (hereinafter referred to as "touch-down");
  the state in which a finger or pen is touching the touch panel 200a (hereinafter referred to as "touch-on");
  the state in which a finger or pen is moving while touching the touch panel 200a (hereinafter referred to as "touch-move");
  the state in which a finger or pen, which has been touching the touch panel 200a, has been separated from the touch panel 200a, in other words, ending of a touch (hereinafter referred to as "touch-up");
  the state in which none is touching the touch panel 200a (hereinafter referred to as "touch-off"); and
  the state in which touch-up is performed in a short time after touch-down is performed onto the touch panel 200a, in other words, such a touch operation as to flip the touch panel 200a (hereinafter referred to as "tap").

Information on these operations or states and the coordinates of a position at which a finger or pen is touching the touch panel 200a is communicated to the system control unit 101 via an internal bus, and then, the system control unit 101 determines how an operation (touch operation) has been performed on the touch panel 200a based on the communicated information. With regard to touch-move, the system control unit 101 is able to also detect the direction of movement of a finger or pen moving on the touch panel 200a for each of a vertical component and a horizontal component on the touch panel 200a based on a change of the position coordinates. Moreover, when touch-up is performed via a given amount of touch-move after touch-down on the touch panel 200a, a stroke is assumed to have been drawn. An operation of quickly drawing a stroke is referred to as "flick". Flick is an operation of quickly moving the finger a certain degree of distance while keeping the finger touching the touch panel 200a and directly separating the finger from the touch panel 200a, and, in other words, is an operation of quickly tracing the touch panel 200a in such a way as to flip the touch panel 200a with the finger. When touch-move having been performed a predetermined distance or more at a predetermined speed or higher has been detected and touch-up has then been directly detected, the system control unit 101 determines that flick has been performed. Moreover, when touch-move having been performed a predetermined distance or more at a speed lower than the predetermined speed has been detected, the system control unit 101 determines that drag has been performed. Moreover, the system control unit 101 is also able to detect an operation of coming in a specific region while performing touch-move (hereinafter referred to as "move-in") and an operation of going out of a specific region while performing touch-move (hereinafter referred to as "move-out"). Additionally, such a touch operation as to shorten a distance between two touch points, in other words, such an operation as to pinch an image which is being displayed, is referred to as "pinch-in", and is used as an operation for reducing an image or increasing the number of displayed images. Such a touch operation as to widen a distance between two touch points, in other words, such an operation as to widen an image which is being displayed, is referred to as "pinch-out", and is used as an operation for enlarging an image or decreasing the number of displayed images. The touch panel 200a can be any type of touch panel selected from among touch panels of various types including, for example, the resistance film type, the capacitance type, the surface acoustic wave type, the infrared ray type, the electromagnetic induction type, the image recognition type, and the optical sensor type.

Figure 2:
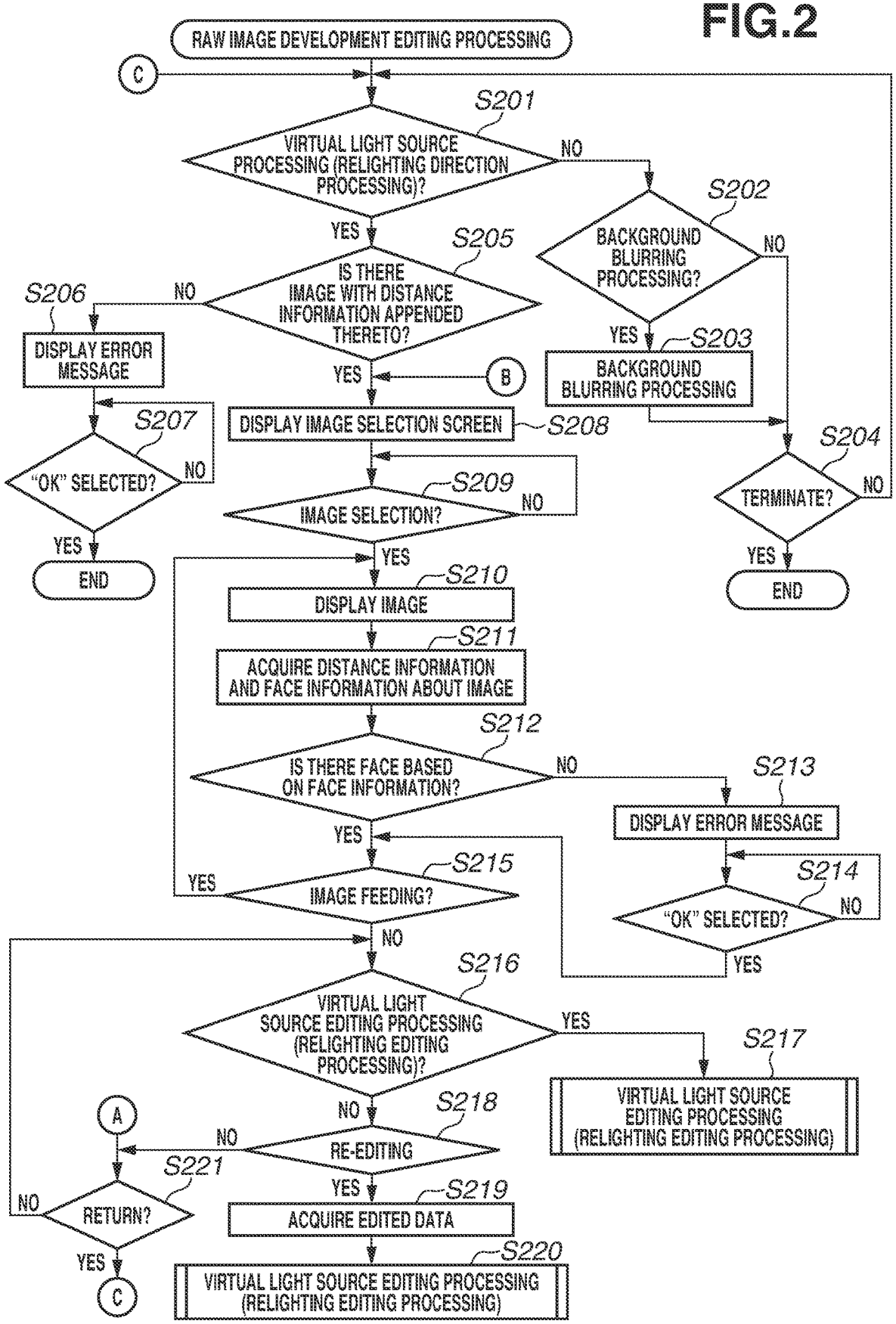
FIG. 2 is a flowchart illustrating raw image development editing processing in the present exemplary embodiment.
Figure 6A:
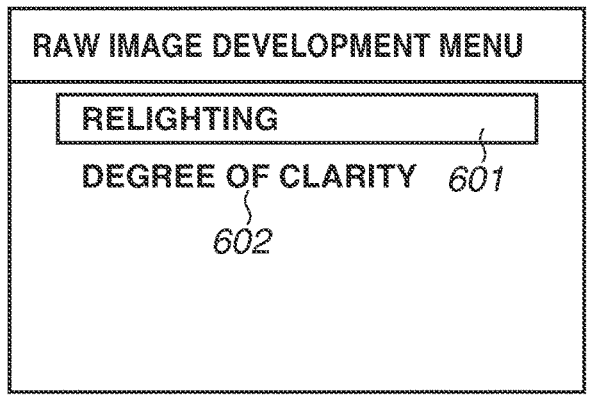
Figure 6A:
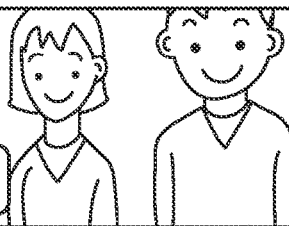
Figure 6A:
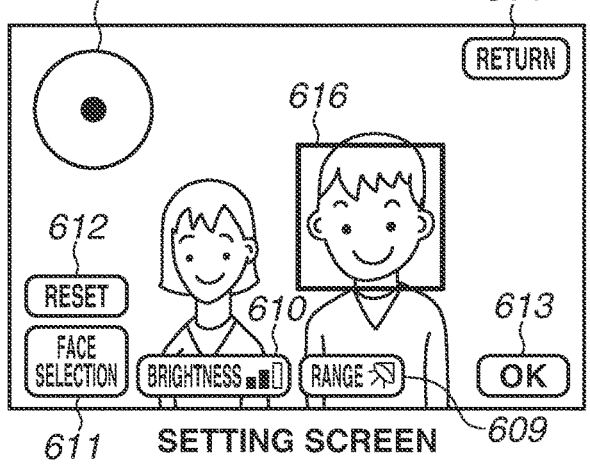
Figure 6A:
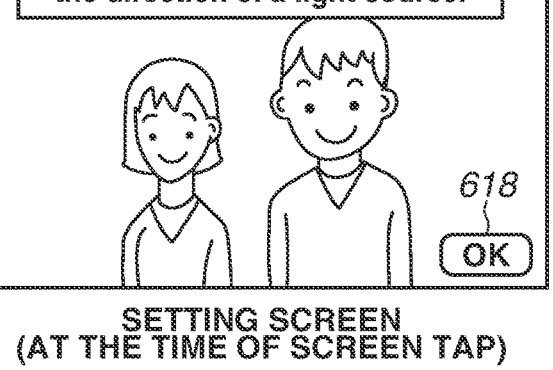

Next, raw image development editing processing in the present exemplary embodiment is described with reference to FIG. 2. This processing is implemented by the system control unit 101 loading a program recorded on the non-volatile memory 114 onto the system memory 112 and executing the loaded program. The raw image development editing processing illustrated in FIG. 2 is started when the digital camera 100 is powered on, a menu for playback is displayed in the menu screen, and, then, an item for raw image development editing processing is selected. When the item for raw image development editing processing is selected, a raw image development menu screen, which includes an item for performing processing for changing a virtual light source direction and an item for performing background blurring processing, is displayed on the display unit 111 as illustrated in FIG. 6A. Both the processing for changing a virtual light source direction and the background blurring processing are performed with use of depth information about an image. Furthermore, the raw image development editing processing is an item which is able to be selected only when the digital camera 100 is currently switched to an image capturing mode such as a manual mode, Av (aperture priority mode), or Tv (shutter speed priority mode). The raw image development editing processing is not able to be selected with respect to a mode in which image capturing items are automatically set by a camera to perform image capturing, such as an automatic image capturing mode.

In step S201, the system control unit 101 determines whether virtual light source processing (relighting direction processing) has been selected. Referring to FIG. 6A, an item 601 is an item used to proceed to virtual light source processing, and an item 602 is an item used to proceed to background blurring processing. The item 601 being selected causes a result of determination in step S201 to become YES. If it is determined that virtual light source processing has been selected (YES in step S201), the system control unit 101 advances the processing to step S205, and, if not so (NO in step S201), the system control unit 101 advances the processing to step S202.

In step S202, the system control unit 101 determines whether background blurring processing has been selected. The background blurring processing is processing operable for changing the degree of clarity of a background portion for a person. The item 602 illustrated in FIG. 6A being selected causes a result of determination in step S202 to become YES. If it is determined that background blurring processing has been selected (YES in step S202), the system control unit 101 advances the processing to step S203, and, if not so (NO in step S202), the system control unit 101 advances the processing to step S204.

In step S203, the system control unit 101 performs background blurring processing.

In step S204, the system control unit 101 determines whether to terminate the raw image development editing processing. With respect to the raw image development editing processing, returning to the menu screen by selection of the menu button 201, proceeding to an image capturing screen by pressing of the shutter button 115, or powering off the digital camera 100 causes a result of determination in step S204 to become YES. If it is determined to terminate the raw image development editing processing (YES in step S204), the system control unit 101 ends the processing illustrated in FIG. 2, and, if not so (NO in step S204), the system control unit 101 returns the processing to step S201.

In step S205, the system control unit 101 determines whether there is an image with distance information, i.e., information about the depth of the image, appended thereto in images recorded on the recording medium 124. The distance information is recorded as Exchangeable image file format (Exif) data about the image. If it is determined that there is an image with distance information appended thereto (YES in step S205), the system control unit 101 advances the processing to step S208, and, if not so (NO in step S205), the system control unit 101 advances the processing to step S206.

In step S206, the system control unit 101 displays an error message on the display unit 111. A guide 605 illustrated in FIG. 6C represents an example of the error message. In a case where there is no image with distance information appended thereto, the system control unit 101 is not able to perform virtual light source processing, and, therefore, advances the processing to step S207, thus terminating the raw image development editing processing. In FIG. 6C, an item 606 which indicates "OK" used to confirm that the user has read the content of the guide 605 is displayed.

In step S207, the system control unit 101 determines whether the user has selected the item 606, which indicates "OK". If it is determined that the item 606 has been selected (YES in step S207), the system control unit 101 ends the raw image development editing processing.

In step S208, the system control unit 101 displays an image selection screen on the display unit 111. FIG. 6B illustrates an example of the image selection screen. The image selection screen shows, in addition to an image recorded on the recording medium 124, a guide 603, which prompts the user to select an image, and an item 604, which indicates advanced settings used for performing editing for changing the direction of a virtual light source, described below, with respect to the selected image.

In step S209, the system control unit 101 determines whether to perform selection of an image. In a case where only a single image is displayed on the display unit 111, the system control unit 101 determines that the user has selected the image displayed on the display unit 111, so that a result of determination in step S209 becomes YES. As described below in step S215, in a case where only a single image is displayed (in the case of single playback), the user is allowed to switch images (perform image feeding) with use of the left and right keys 202*c* and 202*d* of the four-way arrow buttons 202.

In the image selection screen, only one image can be displayed as illustrated in FIG. 6B, or a plurality of images can be simultaneously displayed (multiple playback can be performed). Furthermore, while, at first after transition to step S208, the latest single image, the guide 603, and the item 604 are displayed as illustrated in FIG. 6B, selecting a reduction button (not illustrated) included in the operation unit 200 or performing pinch-in by a touch operation enables increasing the number of images to be displayed. In a case where a plurality of images is currently displayed, when an operation to select any one image is performed by the user, a result of determination in step S209 becomes YES. If, in step S209, it is determined that an image has been selected (YES in step S209), the system control unit 101 advances the processing to step S210.

In step S210, the system control unit 101 displays an image on the display unit 111.

In step S211, the system control unit 101 acquires distance information about the image which is being displayed and face information indicating whether a face has been detected in the image.

In step S212, the system control unit 101 determines whether there is a face based on the face information about the image which is being displayed acquired in step S211. If it is determined that there is a face based on the face information (YES in step S212), the system control unit 101 advances the processing to step S215, and, if not so (NO in step S212), the system control unit 101 advances the processing to step S213.

In step S213, the system control unit 101 displays an error message on the display unit 111. FIG. 6D illustrates an example of the error message, in which a guide indicating that no face has been able to be detected is displayed as indicated by a guide 608. Additionally, an item 607 indicating "OK" used for confirming that the user has read the content of the guide 608 is also displayed.

In step S214, the system control unit 101 determines whether the user has selected the item 607, which indicates "OK". If it is determined that the user has selected the item 607 (YES in step S214), the system control unit 101 advances the processing to step S215.

In step S215, the system control unit 101 determines whether image feeding has been performed. Image feeding is able to be performed by the left or right key 202c or 202d of the four-way arrow buttons 202 or by horizontal touch-move in a touch operation. If it is determined that image feeding (switching of images to be displayed) has been performed (YES in step S215), the system control unit 101 returns the processing to step S210, and, if not so (NO in step S215), the system control unit 101 advances the processing to step S216.

In step S216, the system control unit 101 determines whether to perform virtual light source editing processing (relighting editing processing). The virtual light source editing processing is processing for changing the state of a virtual light source onto the face of a person, for example, the direction or intensity of the virtual light source, with use of an imaginary light source, and is able to be performed by selecting advanced settings in the item 604 illustrated in FIG. 6B. If it is determined to perform virtual light source editing processing (YES in step S216), the system control unit 101 advances the processing to step S217, and, if not so (NO in step S216), the system control unit 101 advances the processing to step S218.

In step S217, the system control unit 101 performs virtual light source editing processing. Details of the virtual light source editing processing are described below with reference to FIGS. 3A and 3B.

In step S218, the system control unit 101 determines whether to perform re-editing of an image. As described below, if virtual light source editing processing is performed on each image, the content obtained by editing is stored and, then, further editing processing is able to continue being performed on the stored content. In other words, if, in the former editing, the content indicating a state in which the direction of a virtual light source is set is stored, the current editing is able to be performed in such a way as to adjust the intensity of light emitted from the virtual light source without changing the stored direction of the virtual light source. If it is determined to perform re-editing of an image (YES in step S218), the system control unit 101 advances the processing to step S219, and, if not so (NO in step S218), the system control unit 101 advances the processing to step S221. Furthermore, instead of performing re-editing, the system control unit 101 is able to reset the content obtained by the former editing.

In step S219, the system control unit 101 acquires edited data. The edited data can be recorded in an Exif file together with distance information or face information about the selected image, or can be separately recorded on the recording medium 124. In a case where, in response to a result of determination in step S218 being YES, the system control unit 101 proceeds to virtual light source editing processing, the system control unit 101 performs processing illustrated in FIGS. 3A and 3B based on the edited data acquired in step S219.

In step S220, the system control unit 101 performs virtual light source editing processing. Details of the virtual light source editing processing are described below with reference to FIGS. 3A and 3B.

In step S221, the system control unit 101 determines whether to return to the raw image development menu screen. Pressing the menu button 201 enables returning to the raw image development menu screen. If it is determined to return to the raw image development menu screen (YES in step S221), the system control unit 101 returns the processing to step S201, and, if not so (NO in step S221), the system control unit 101 returns the processing to step S216.

Figure 3A:
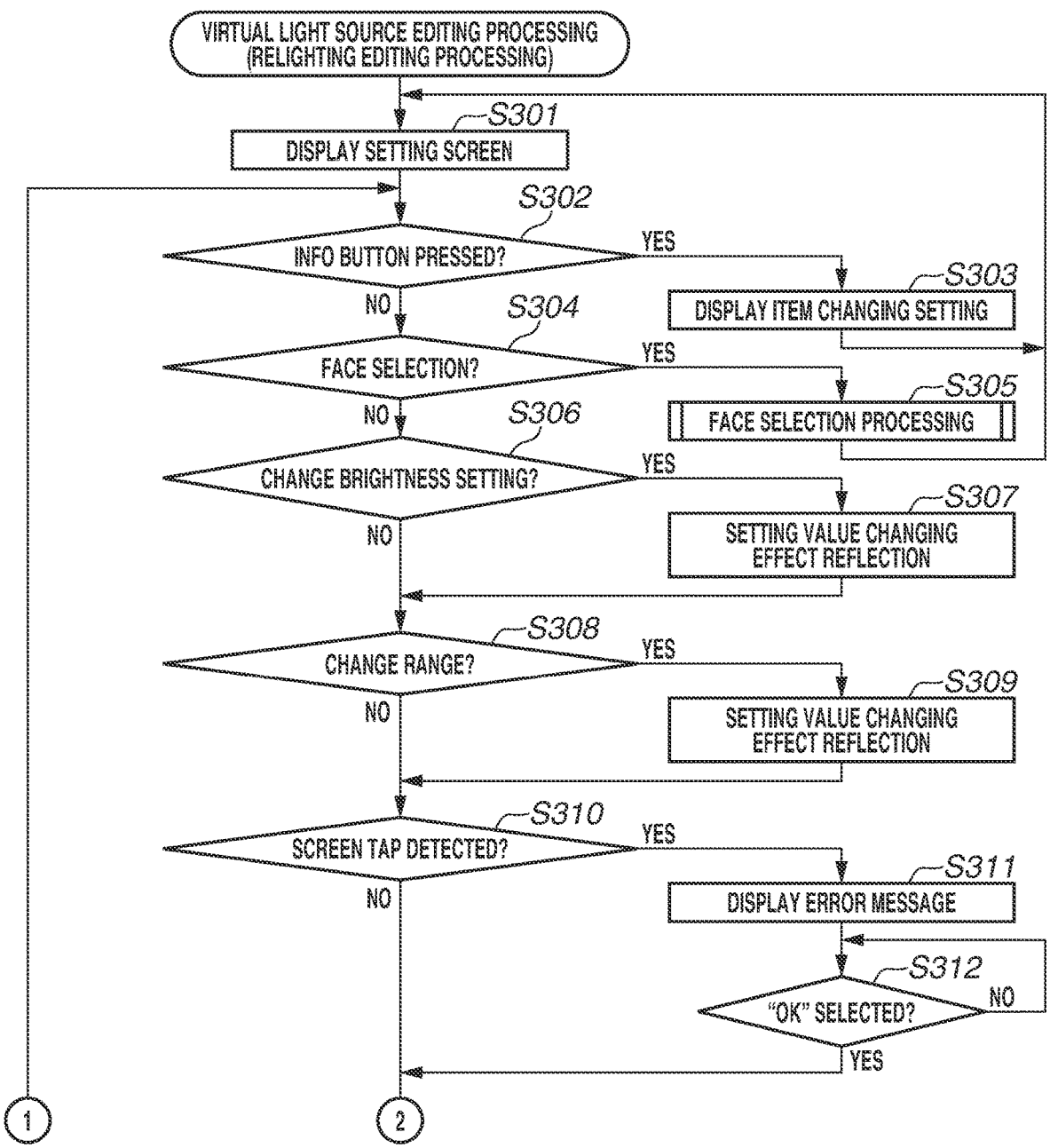
FIGS. 3A and 3B are flowcharts illustrating virtual light source editing processing in the present exemplary embodiment.
Figure 3B:
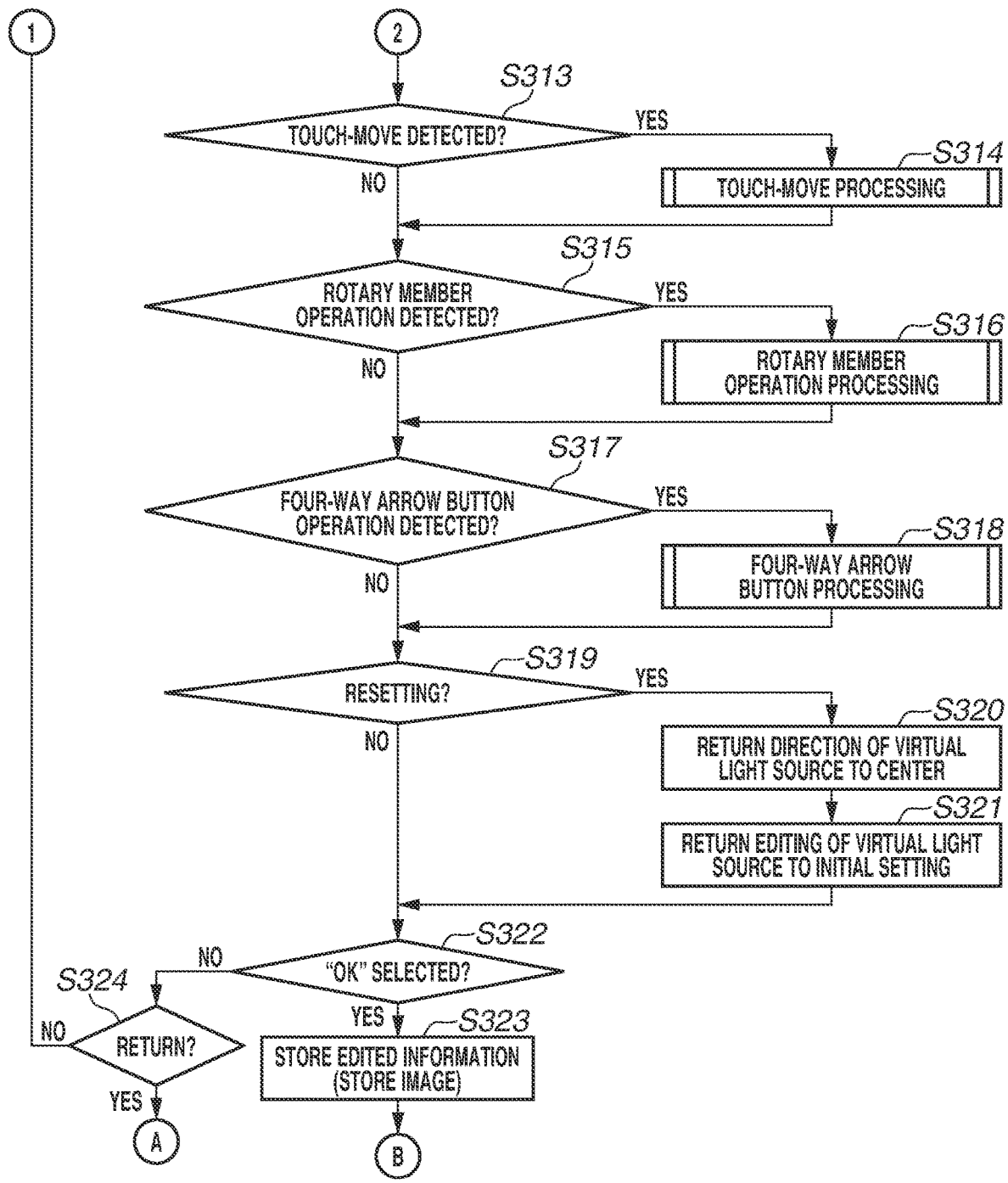

Next, virtual light source editing processing in the present exemplary embodiment is described with reference to FIGS. 3A and 3B. This processing is implemented by the system control unit 101 loading a program recorded on the non-volatile memory 114 onto the system memory 112 and executing the loaded program. Processing illustrated in FIGS. 3A and 3B is started when the system control unit 101 advances the processing to step S217 or S220 illustrated in FIG. 2.

In step S301, the system control unit 101 displays a setting screen on the display unit 111. FIG. 6E illustrates an example of a setting screen. The setting screen shows, in addition to an image (captured image) selected in step S209, a plurality of items used for performing respective editing operations. Here, processing for changing the state of a virtual light source which is able to be edited in the virtual light source editing processing is described together with items which are displayed in the setting screen.

An item 609 is an item used to perform processing for changing a virtual light source illumination range in three levels. The virtual light source illumination range is selectable from among "narrow", "standard", and "wide".

An item 610 is an item used to perform processing for changing the brightness of a virtual light source in three levels. The brightness of a virtual light source is selectable from among "weak", "medium", and "strong".

An item 611 is an item used to change a face to be selected. In the present exemplary embodiment, in a case where a plurality of faces has been detected, the user is allowed to select a face serving as a center illuminated by a virtual light source. When the user sets the direction of the virtual light source to the rightward direction, image processing is performed in such a manner that the selected face is illuminated by the virtual light source from the rightward direction of the selected face (as viewed from the user performing editing). At this time, in a case where another face is located on the right-hand side of the face which is currently selected (as viewed from the user performing editing), light becomes falling on about the center of such another face or light becomes falling on such another face from the leftward direction. In other words, in a case where the user wants to cause the virtual light source to illuminate a given face from the right-hand side thereof, selecting the given face enables image processing desired by the user to be performed. The user is allowed to select the item 611 to switch a subject serving as a center to be illuminated by the virtual light source.

An item 612 is an item used to reset editing, and an item 613 is an item used to store editing.

An item 614 is an item used to return to the image selection screen, and an item 615 is an item which indicates an illumination direction of the virtual light source. Additionally, an item 616 is an item which indicates a face which is currently selected (which discriminably indicates a face which is not currently selected).

In step S302, the system control unit 101 determines whether the INFO button 206 has been pressed. If it is determined that the INFO button 206 has been pressed (YES in step S302), the system control unit 101 advances the processing to step S303, and, if not so (NO in step S302), the system control unit 101 advances the processing to step S304.

Figure 6G:
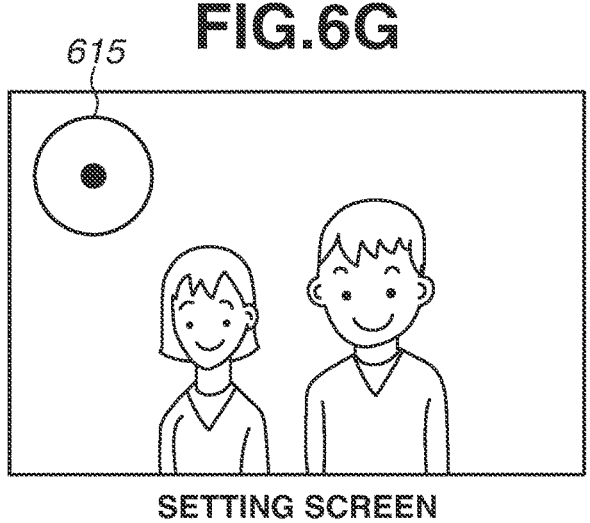

In step S303, the system control unit 101 performs setting for changing display items. In the setting screen illustrated in FIG. 6E, the item 609 to the item 616 are displayed. In the case of performing editing of an image with use of a virtual light source, the user performs an editing operation while checking, for example, the degree of light falling on a subject or an atmosphere thereof. Therefore, turning on and off displaying of each item is configured to be enabled. When the INFO button 206 is pressed, the item 609 to the item 614 and the item 616 are hidden as illustrated in FIG. 6G. The item 615, which is an item indicating an illumination direction of the virtual light source, is kept displayed.

In step S304, the system control unit 101 determines whether an instruction to perform face selection has been issued. In other words, the system control unit 101 determines whether the item 611 has been selected. If it is determined that an instruction to perform face selection has been issued (YES in step S304), the system control unit 101 advances the processing to step S305, and, if not so (NO in step S304), the system control unit 101 advances the processing to step S306.

In step S305, the system control unit 101 performs face selection processing. The face selection processing is described below with reference to FIG. 4.

In step S306, the system control unit 101 determines whether an instruction to change the brightness setting of the virtual light source has been issued. In other words, the system control unit 101 determines whether the item 610 has been selected. If it is determined that an instruction to change the brightness setting has been issued (YES in step S306), the system control unit 101 advances the processing to step S307, and, if not so (NO in step S306), the system control unit 101 advances the processing to step S308.

In step S307, the system control unit 101 changes the brightness of the virtual light source according to an instruction from the user. When the item 610 is selected, the system control unit 101 displays an icon indicating three levels, i.e., strong, medium, and weak, thus enabling the user to select the intensity of the brightness.

In step S308, the system control unit 101 determines whether an instruction to change the range of the virtual light source has been issued. In other words, the system control unit 101 determines whether the item 609 has been selected. If it is determined that an instruction to change the range has been issued (YES in step S308), the system control unit 101 advances the processing to step S309, and, if not so (NO in step S308), the system control unit 101 advances the processing to step S310.

In step S309, the system control unit 101 changes the virtual light source illumination range according to an instruction from the user. The item 609 is an item used to perform processing for changing the range in three levels. When the item 609 is selected, the system control unit 101 displays an icon indicating three levels, i.e., narrow, standard, and wide, thus enabling the user to select the range.

In step S310, the system control unit 101 determines whether a tap operation on an image (not including items) has been performed. If a range in which any one of the items 609 to 614 is displayed is tapped even in an image, a result of determination in step S310 becomes NO. If it is determined that the tap operation has been performed (YES in step S310), the system control unit 101 advances the processing to step S311, and, if not so (NO in step S310), the system control unit 101 advances the processing to step S313.

In step S311, the system control unit 101 displays an error message on the display unit 111. A guide 617 illustrated in FIG. 6F is an example of the error message to be displayed in step S311, and indicates that touch-move enables changing the direction of virtual light source. In the present exemplary embodiment, to distinguish between an operation which selects an item displayed in the setting screen and an operation which changes the direction of a virtual light source, a touch-move operation is used to enable changing the direction of a virtual light source. Therefore, in a case where it is determined that a region on the image in which none of the items 609 to 614 are displayed has been tapped, the system control unit 101 displays an error message. Preventing changing of the direction of a virtual light source from being received with a tap operation enables preventing the direction of a virtual light source from being changed unconsciously due to the touch position of the user who intends to select an item deviating from the position of the item.

In step S312, the system control unit 101 determines whether an item 618 which indicates "OK" displayed together with the guide 617 has been selected. If it is determined that the item 618 has been selected by the user (YES in step S312), the system control unit 101 determines that the user has confirmed the guide 617 and thus advances the processing to step S313.

In step S313, the system control unit 101 determines whether touch-move has been detected. A region in which touch-move is receivable is the entire range of the setting screen in the present exemplary embodiment. If it is determined that touch-move has been detected (YES in step S313), the system control unit 101 advances the processing to step S314, and, if not so (NO in step S313), the system control unit 101 advances the processing to step S315.

In step S314, the system control unit 101 performs touch-move processing. The touch-move processing is described below with reference to FIG. 5.

In step S315, the system control unit 101 determines whether a rotary member operation has been detected. The rotary member operation is a rotating operation which is performed on the electronic dial 205 or the controller wheel 204. If it is determined that the rotary member operation has been detected (YES in step S315), the system control unit 101 advances the processing to step S316, and, if not so (NO in step S315), the system control unit 101 advances the processing to step S317.

In step S316, the system control unit 101 performs rotary member operation processing. The rotary member operation processing is described below with reference to FIGS. 9A and 9B.

In step S317, the system control unit 101 determines whether a four-way arrow button operation has been detected. If any one key of the four-way arrow buttons 202 has been operated, a result of determination in step S317 becomes YES, so that the system control unit 101 advances the processing to step S318, and, if not so (NO in step S317), the system control unit 101 advances the processing to step S319.

In step S318, the system control unit 101 performs four-way arrow button processing. The four-way arrow button processing is described below with reference to FIGS. 10A, 10B, and 10C.

In step S319, the system control unit 101 determines whether an operation to issue an instruction for resetting editing of the virtual light source has been performed. In other words, the system control unit 101 determines whether the item 612 has been selected. If it is determined that an instruction for resetting has been issued (YES in step S319), the system control unit 101 advances the processing to step S320, and, if not so (NO in step S319), the system control unit 101 advances the processing to step S322.

In step S320, the system control unit 101 returns the direction of the virtual light source which the item 615 indicates to the center. The item 615 indicates the direction of the virtual light source. While, when the direction of the virtual light source is changed, as indicated by an item 615 illustrated in FIG. 6H, an item 615a moves from the center, the item 615a then moves to the position of the center in step S320.

In step S321, the system control unit 101 returns editing of the virtual light source to the initial setting. Thus, even if, for example, the intensity or range of the virtual light source has been changed, the system control unit 101 returns such editing to the initial setting.

In step S322, the system control unit 101 determines whether an instruction for storing editing has been issued. In other words, the system control unit 101 determines whether the item 613, which indicates "OK", has been selected. If, in step S322, it is determined that an instruction for storing editing has been issued (YES in step S322), the system control unit 101 advances the processing to step S323, and, if not so (NO in step S322), the system control unit 101 advances the processing to step S324.

In step S323, the system control unit 101 stores and records edited information about the virtual light source on the recording medium 124.

In step S324, the system control unit 101 determines whether an instruction for ending displaying of the editing screen has been issued. In other words, the system control unit 101 determines whether the item 614 has been selected. If it is determined that an instruction for ending displaying of the editing screen has been issued (YES in step S324), the system control unit 101 returns the processing to step S221 illustrated in FIG. 2, and, if not so (NO in step S324), the system control unit 101 returns the processing to step S302.

Figure 4:
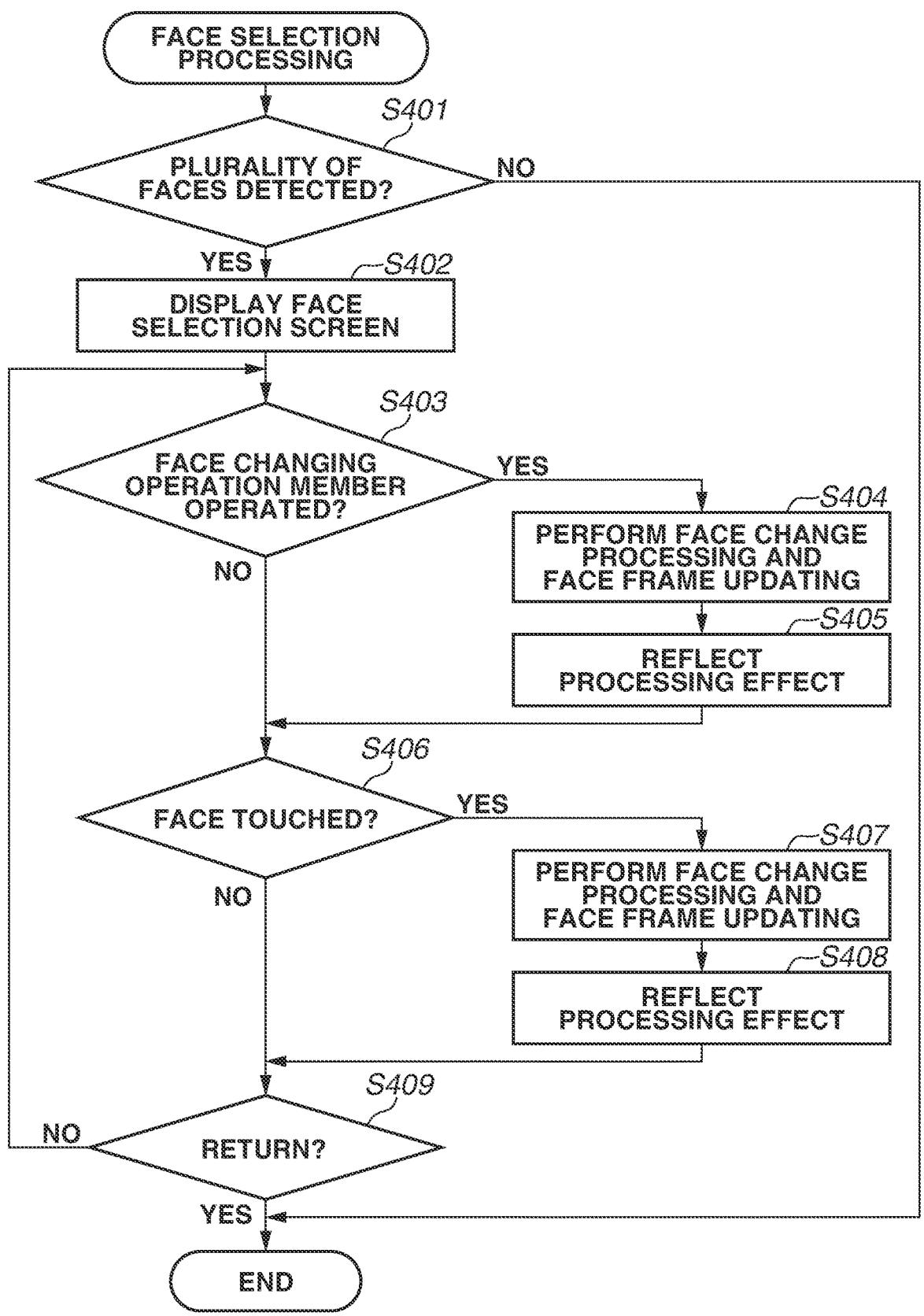
FIG. 4 is a flowchart illustrating face selection processing in the present exemplary embodiment.

Next, face selection processing in the present exemplary embodiment is described with reference to FIG. 4. This processing is implemented by the system control unit 101 loading a program recorded on the non-volatile memory 114 onto the system memory 112 and executing the loaded program. Processing illustrated in FIG. 4 is started when the system control unit 101 advances the processing to step S305 illustrated in FIG. 3A.

In step S401, the system control unit 101 determines whether a plurality of faces has been detected based on the face information acquired in step S211 illustrated in FIG. 2. If it is determined that a plurality of faces has been detected (YES in step S401), the system control unit 101 advances the processing to step S402, and, if not so (NO in step S401), the system control unit 101 ends the processing illustrated in FIG. 4.

Figure 6H:
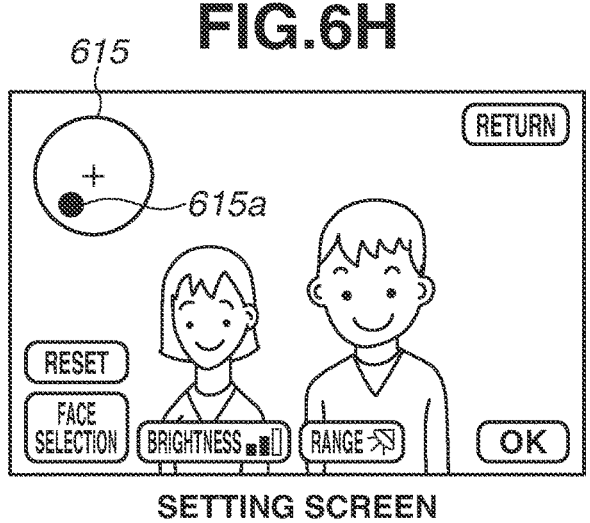
Figure 6I:
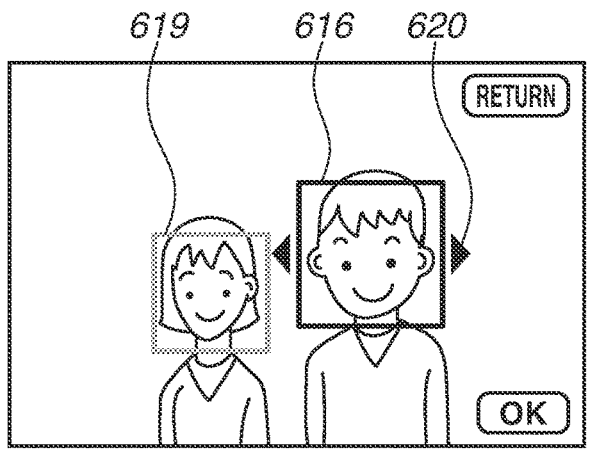

In step S402, the system control unit 101 displays a face selection screen on the display unit 111. In the face selection screen, the user is allowed to switch a subject (face) serving as a center with respect to which to change the illumination direction of the virtual light source. Furthermore, faces which are switchable are determined based on information about faces recorded together with images. For example, in a case where the face is too small or is blurred, even if a subject is included in an image, it is highly possible that the subject is not detected as a face and it is highly possible that it is not impossible to select such a face in the face selection screen. FIG. 6I illustrates an example of the face selection screen. An item 616 is an item (face frame) indicating a face which is currently selected. Marks 620, which represent arrows, are displayed on the sides of the item 616 and indicate that the item 616 is movable. Moreover, an item 619 is an item (face frame) indicating a face which is able to be selected.

The present exemplary embodiment is configured to switch between a screen used to receive an operation for selecting a face and a screen used to change the illumination angle (a screen used to change the degree of application of an effect), so that, when one operation is able to be received, the other operation is prevented from being received. With this configuration, since, when the illumination direction is to be changed, the item 619, which indicates a face which is able to be selected, is not displayed, the user not only becomes able to easily check the degree of application of an effect but also becomes able to check a face which is currently selected and a face which is able to be selected in the face selection screen.

Moreover, this configuration enables decreasing such a possibility that, when the user has tried to select a face by a touch operation, the touch position would move to cause the illumination direction to be changed to an unintended illumination direction. Moreover, this configuration enables decreasing such a possibility that, when the user has tried to change the illumination direction by a touch operation, the user would unintentionally touch a face to cause a face intended for selection to be unintentionally changed. However, in a case where the user is performing selection of a face or changing of the illumination direction by not a touch operation but an operation on an operation member, a screen used to receive an operation for selecting a face and a screen used to change the illumination angle can be the same.

In step S403, the system control unit 101 determines whether an operation on an operation member used to change a face targeted for selection has been performed. The face targeted for selection is able to be selected by an operation which moves the multi-controller 208 rightward or leftward or, in a case where the position of a face which is able to be selected is located above or below a face which is currently selected, by an operation which moves the multi-controller 208 upward or downward. Additionally, the face targeted for selection is able to be changed by an operation which rotates the controller wheel 204. If it is determined that an operation on an operation member used to change a face targeted for selection has been performed (YES in step S403), the system control unit 101 advances the processing to step S404, and, if not so (NO in step S403), the system control unit 101 advances the processing to step S406.

Figure 6J:
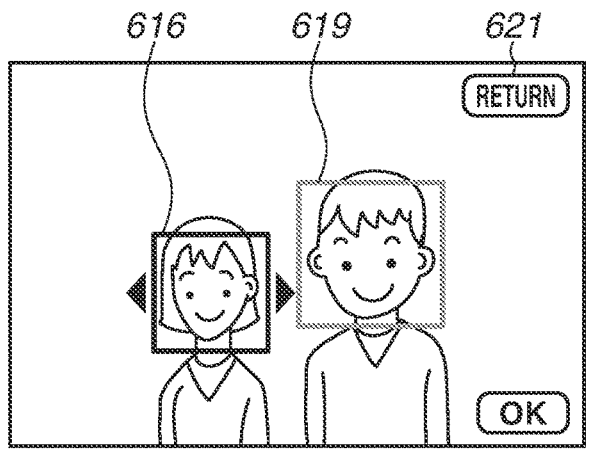

In step S404, the system control unit 101 performs processing for changing a face targeted for selection, and performs processing for updating displaying of the item 616, which indicates a face which is currently selected. FIG. 6J illustrates a display example in a case where the face targeted for selection has been changed from that illustrated in FIG. 6I. In FIG. 6J, the face shown in the item 616 has switched from the right subject to the left subject.

In step S405, the system control unit 101 performs image processing for causing a virtual light source to illuminate the face selected in step S404 with a focus set thereon. In a case where the face targeted for selection is changed, the system control unit 101 directly turns over parameters such as the illumination direction and brightness which have been set in the just previously selected face and performs image processing even in step S405. However, the system control unit 101 can be configured to perform image processing for causing a virtual light source to illuminate from an initial direction each time the face is switched. In a case where the system control unit 101 directly turns over the illumination direction which has been set in the just previously selected face, this configuration is effective when, for example, the right-hand side in the entire image is dark and the user wants to cause illumination to be made from the right direction and wants to make a comparison as to which face being focused on to be illuminated by a virtual light source is most appropriate. Without performing an operation which returns to a screen for changing the former illumination direction of a virtual light source and then changes the illumination direction, the user is able to make a comparison about the degree of application of an effect caused by a face targeted for selection only by switching faces in the face selection screen. At this time, the timing at which to reflect the effect of a virtual light source in the selected face can be timing immediately after changing or can be timing after the elapse of a predetermined time.

In step S406, the system control unit 101 determines whether a touch operation has been performed on a face which is able to be selected. If it is determined that a touch operation has been performed on a face which is able to be selected, i.e., a face with respect to which the item 619 has been selected (YES in step S406), the system control unit 101 advances the processing to step S407, and, if not so (NO in step S406), the system control unit 101 advances the processing to step S409.

Processing in steps S407 and S408 is similar to the processing in steps S404 and S405.

In step S409, the system control unit 101 determines whether an operation which returns the displayed screen from the face selection screen to the setting screen has been performed. Returning the displayed screen from the face selection screen to the setting screen is able to be performed by selecting an item 621. If it is determined that such an operation for returning has been performed (YES in step S409), the system control unit 101 ends the processing illustrated in FIG. 4, and, if not so (NO in step S409), the system control unit 101 returns the processing to step S403.

Figure 5:
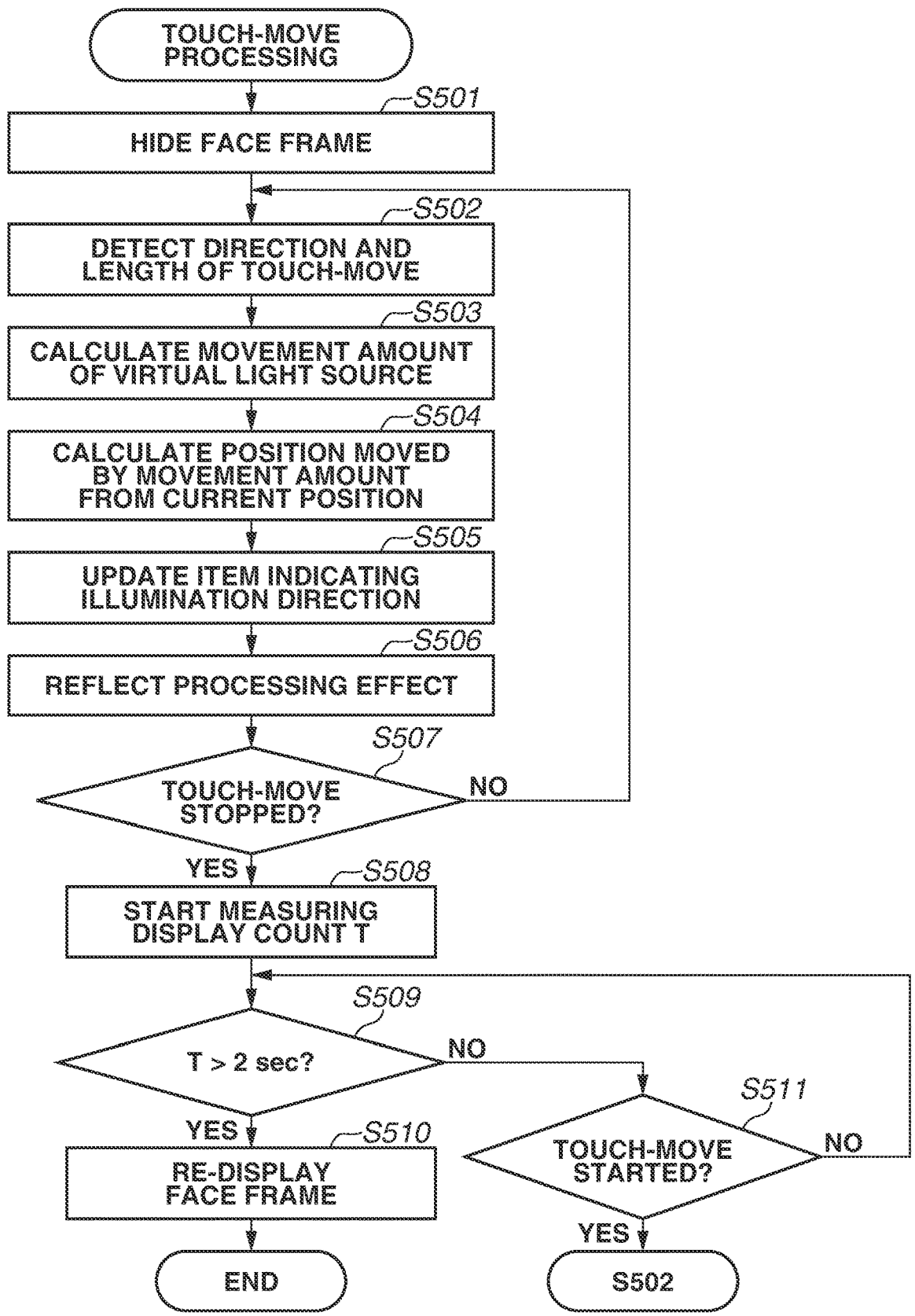
FIG. 5 is a flowchart illustrating touch-move processing in the present exemplary embodiment.

Next, touch-move processing in the present exemplary embodiment is described with reference to FIG. 5. This processing is implemented by the system control unit 101 loading a program recorded on the non-volatile memory 114 onto the system memory 112 and executing the loaded program. Processing illustrated in FIG. 5 is started when the system control unit 101 advances the processing to step S314 illustrated in FIG. 3B.

In step S501, the system control unit 101 hides the item 616, which indicates a face which is currently selected. FIG. 6H illustrates an example of a setting screen displayed when touch-move processing has been performed, and, when touch-move being started with the state of the setting screen illustrated in FIG. 6E is detected, the screen illustrated in FIG. 6H, in which the item 616 is hidden, is displayed. Since displaying the item 616 enables the user to know which face is a face which is currently selected, the user is able to easily recognize a face serving as a center currently illuminated by a virtual light source. On the other hand, if an item remains displayed around a face, it becomes hard to know how the effect of illumination has changed. Therefore, in response to touch-move starting and the user changing the illumination direction (starting changing the degree of application of the effect), the system control unit 101 hides the item 616. This enables the user to easily understand the effect of a virtual light source and recognize a subject which is currently selected (because the item 616 continues being displayed until just before the effect of a virtual light source is changed). Furthermore, without hiding the item 616, for example, a region in which the periphery of a face which is currently selected and the item 616 overlap can be made small or displaying of the item 616 can be made light.

In step S502, the system control unit 101 detects the direction and length (vector) of touch-move detected in step S313.

Here, the illumination direction of a virtual light source and displaying of an item which indicates the illumination direction are described with reference to FIG. 7.

The virtual light source is able to be moved on a surface region 701 which is a hemisphere covering the entire front face centering on a face which is currently selected. Since the virtual light source always faces the center of the face, moving the virtual light source on the hemispherical surface region 701 enables freely changing the direction of a light source. The item 615, which is displayed in the screen, represents a state obtained by projecting the hemispherical surface region 701 onto a plain surface, and is composed of a range of movement 707 of the virtual light source, an indicator 708 which indicates the current position of the virtual light source (the item 615a illustrated in FIG. 6H), and a center indicator 709 which indicates the vertex of the hemispherical surface region 701. There are illustrated typical positions 702 to 706 of the virtual light source (respectively referred to as "position A" to "position E" in sequence). These positions are indicated on the respective items 710 to 714, which indicate the respective illumination directions. If the brightness in directions other than the illumination direction and parameters for the illumination range are fixed, the intensity of the virtual light source applied to a face which is currently selected is the same wherever the position of the item 615a is. In other words, even if the indicator 708 has come close to the center indicator 709, such an effect that the virtual light source comes close to a face which is currently selected or the virtual light source becomes brighter is not applied. It only means that a two-dimensional representation of a hemisphere on which the virtual light source is movable is the item 615 (the range of movement 707). The illumination direction of the virtual light source, i.e., the position of the virtual light source on the hemispherical surface region, is able to be changed with use of the touch panel 200a or the operation unit 200. Additionally, since the indicator on the item which indicates the illumination direction also moves according to a change of the direction of the virtual light source, the user is able to change the illumination direction of the virtual light source in the same way as the user moves the item 615a on the setting screen.

In a case where, in the setting screen, the item 615a has moved onto the line of the item 615, the item 615a is not able to further move to the outside thereof. Therefore, for example, in a case where the item 615a has moved to the right end of the item 615, when the user has performed touch-move obliquely rightward and upward, the item 615a moves only upward (by an amount corresponding to a vector of the upward touch-move) in such a way as to trace the circumference of the item 615.

Figure 7:
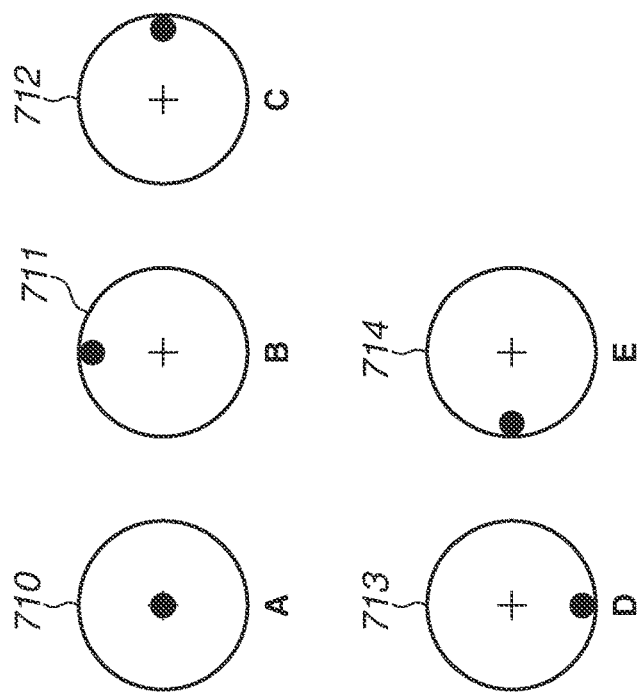
FIG. 7 is a diagram used to explain directions of virtual light sources in the present exemplary embodiment.
Figure 7:
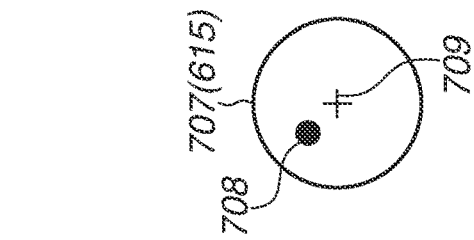
Figure 7:
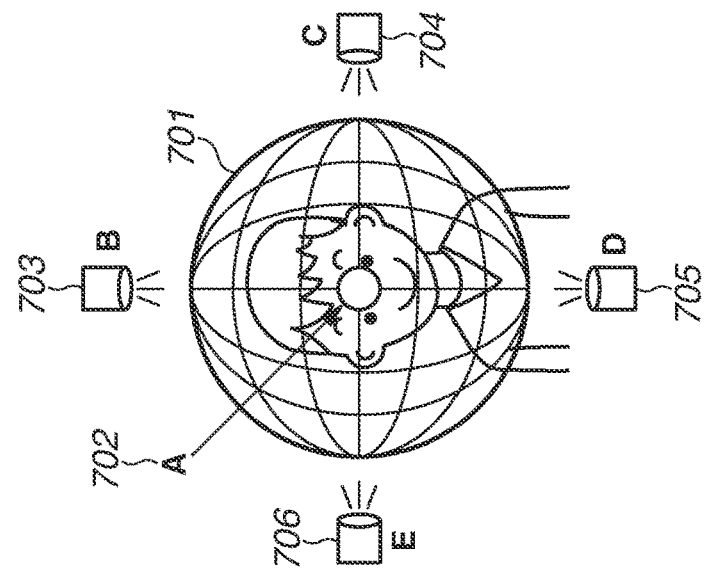

Thus far is the description concerning FIG. 7.

In step S503, the system control unit 101 calculates the movement amount of the virtual light source, i.e., by which angle on the hemisphere to move the virtual light source, based on the vector of the touch-move detected in step S502.

In step S504, the system control unit 101 calculates the position to which the virtual light source has been moved by the movement amount calculated in step S503 from the current position thereof.

In step S505, the system control unit 101 updates displaying of the item 615 based on the position calculated in step S504.

In step S506, the system control unit 101 performs image processing for changing the illumination direction of the virtual light source based on the position calculated in step S504. As mentioned above, the illumination direction of the virtual light source is changed from the setting obtained at the start of touch-move according to the amount and direction of the touch-move irrespective of the start position of a touch performed by the user. In other words, in a case where the virtual light source performs illumination from the right, since performing touch-move on the left side of the setting screen enables changing the illumination direction, the finger of the user which performs a touch operation does not cover a face which is currently selected, so that visibility does not decrease. Moreover, since an item which indicates the virtual light source on the setting screen is not displayed in superimposition on an image and the item 615, by which the user is able to recognize the direction of the virtual light source with respect to a subject which is currently selected, is displayed, even when performing a touch operation in a relative manner, the user is able to recognize the current illumination direction. If an item which indicates the virtual light source on the setting screen is displayed in superimposition on an image, in a case where the illumination range of the virtual light source is set narrow, the item may be displayed in superimposition on a face which is currently selected or may be displayed at a position very close to an image which is currently selected or displayed. Therefore, displaying such an item 615 as described in the present exemplary embodiment enables the user to perform an operation of changing the illumination direction by a touch operation with good operability irrespective of the setting performed by the user. Moreover, while, in the selection of a face described with reference to FIG. 4, a subject located at a touch position on an image is selected (absolute position designation), relative position designation is used to change the illumination direction. While, in the selection of a subject to which an effect is to be applied, directly touching a target for selection on the screen is easier for the user to recognize, relatively changing an effect to be applied to an image is easier for the user to recognize with respect to an effect to be applied to a subject.

In step S507, the system control unit 101 determines whether touch-move has been stopped. If it is determined that touch-move has been stopped (YES in step S507), the system control unit 101 advances the processing to step S508, and, if not so (NO in step S507), the system control unit 101 returns the processing to step S502.

In step S508, the system control unit 101 starts measuring a display count T. The display count T is a time for counting a time until the item 615 indicating a face which is currently selected, which has been hidden in step S501, is displayed again. In the present exemplary embodiment, after touch-move is stopped, if 2 seconds elapses while touch-move is not started, the item 615 is displayed again.

In step S509, the system control unit 101 determines whether the display count T has exceeded 2 seconds. If it is determined that the display count T has exceeded 2 seconds (YES in step S509), the system control unit 101 advances the processing to step S510, in which the system control unit 101 re-displays the item 615. If it is determined that the display count T has not yet exceeded 2 seconds (NO in step S509), the system control unit 101 advances the processing to step S511.

In step S511, the system control unit 101 determines whether touch-move has been started again, and, if it is determined that touch-move has been started again (YES in step S511), the system control unit 101 returns the processing to step S502, and, if not so (NO in step S511), the system control unit 101 returns the processing to step S509.

Figure 8A:
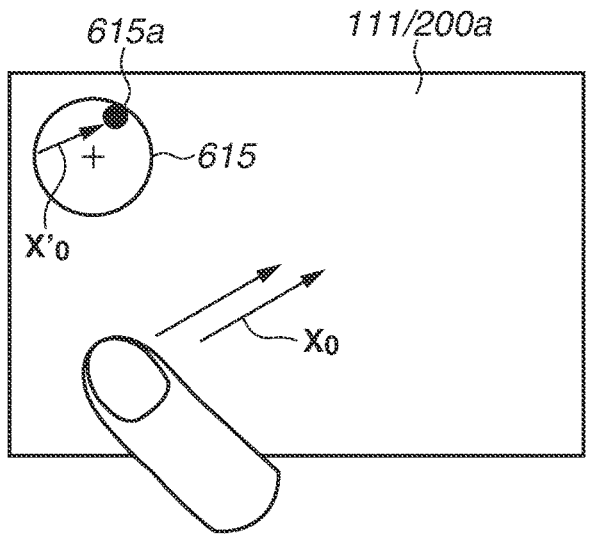
FIGS. 8A, 8B, and 8C are diagrams used to explain touch operations in the present exemplary embodiment.
Figure 8B:
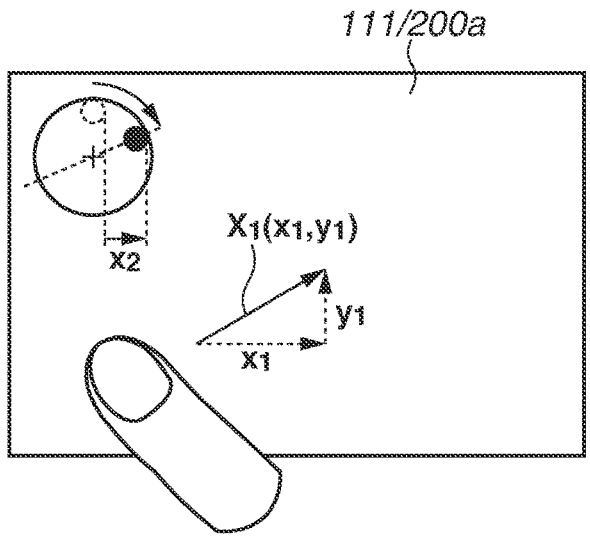
Figure 8C:
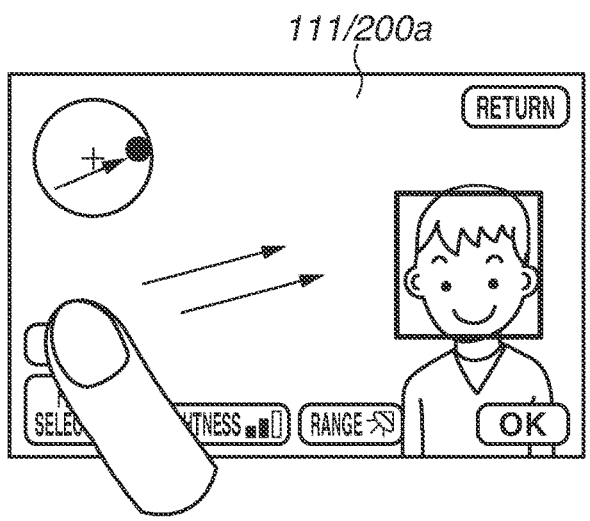

Here, an operation for changing the illumination direction of the virtual light source by a touch-move operation in the present exemplary embodiment is described with reference to FIGS. 8A, 8B, and 8C.

As mentioned above, changing of the illumination direction by a touch operation is performed in a relative manner according to the direction and length of touch-move. To move the virtual light source to an intended position (i.e., a position representing the illumination direction), as illustrated in FIG. 8A, the user repeats touch-move (drag) in the same direction several times in such a way as to cause the position of the item 615a to reach the intended position. Moreover, when, in a state in which the item 615a has reached the outer circumference of a hemispherical region described with reference to FIG. 7, the user continues touch-move toward a region exceeding the hemisphere, as illustrated in FIG. 8B, the indicator (item 615a) moves along the outer circumference according to the touch-move direction. In other words, referring to FIG. 8A, supposing that the vector of touch-move performed by the user is X0, the item 615a moves by X'0 corresponding to X0. As a result of movement in FIG. 8A, starting with the state in which the item 615a is situated on the outer circumference of the item 615, when the user further performs touch-move in the upper right direction, the following effect is exerted. Suppose that the vector of touch-move in FIG. 8B is X1 and the respective movement amounts for the x-axis and Y-axis are x1 and y1. At this time, the item 615a moves along the circumference of the item 615 in such a way as to move in the x-axis direction by the movement amount x2 corresponding to x1.

Moreover, since the position of the item 615a moves in relative relationship to a touch-move operation, even if the user performs a touch-move operation at any position in the setting screen, the user is able to move the indicator (item 615a) in an optional direction. Particularly, in an apparatus having a small screen, such as the digital camera 100 or a smartphone, the operability thereof improves.

On the other hand, a method of designating a position on the screen with an absolute position has the advantage of facilitating intuitive recognition of the position. In the present exemplary embodiment, since a face which is able to be selected can be situated at the end of the screen, as long as the illumination direction of the virtual light source is able to be changed in a relative manner, an operation can be easily performed even when the face which is currently selected is situated at the right-hand end of the screen as illustrated in FIG. 8C.

Figure 9A:
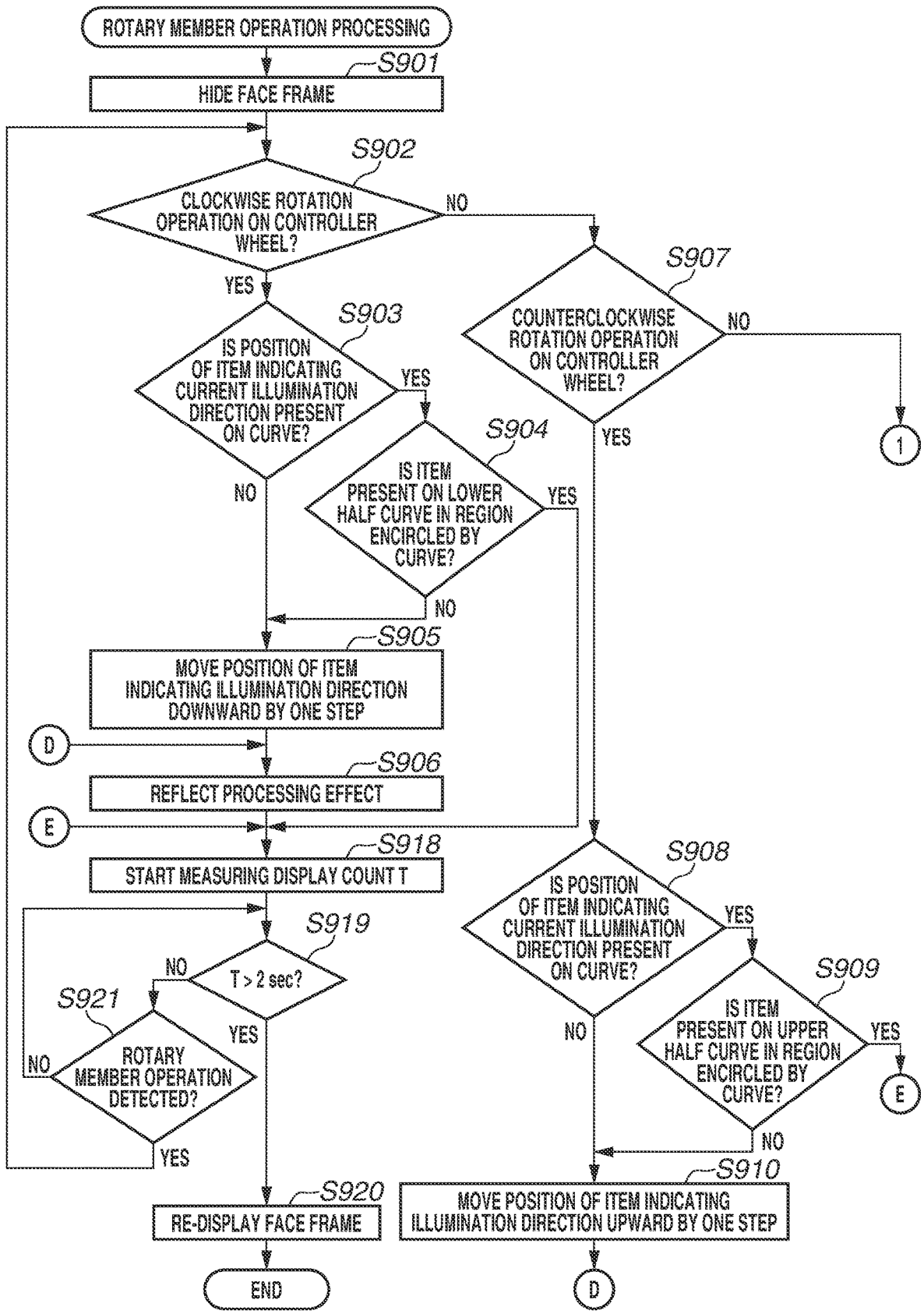
FIGS. 9A and 9B are flowcharts illustrating rotary member operation processing in the present exemplary embodiment.
Figure 9B:
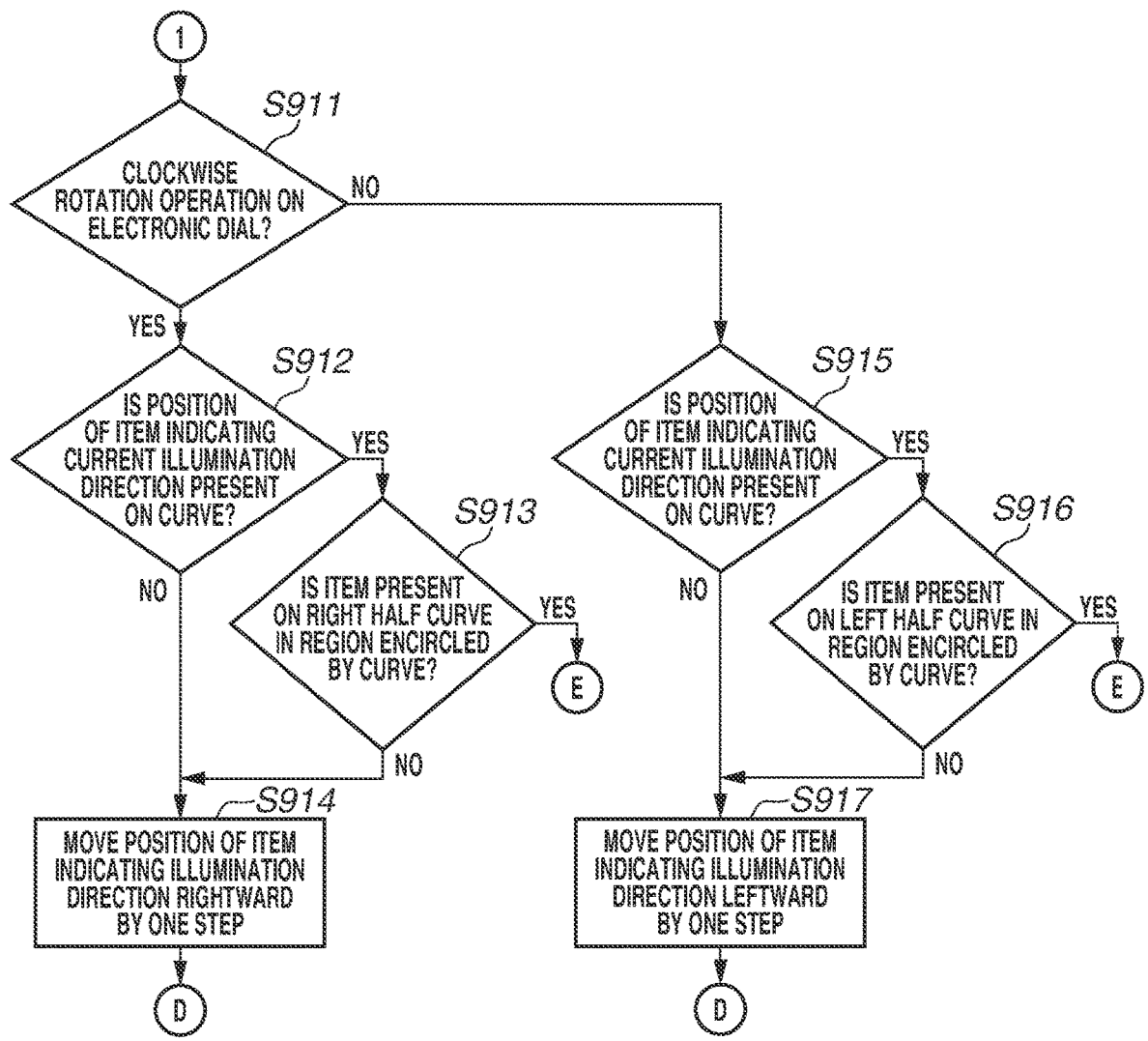

Next, rotary member operation processing in the present exemplary embodiment is described with reference to FIGS. 9A and 9B. This processing is implemented by the system control unit 101 loading a program recorded on the non-volatile memory 114 onto the system memory 112 and executing the loaded program. Processing illustrated in FIGS. 9A and 9B is started when the system control unit 101 advances the processing to step S316 illustrated in FIG. 3B.

In step S901, the system control unit 101 hides the item 616, which indicates a face which is currently selected, as with step S501 illustrated in FIG. 5.

In step S902, the system control unit 101 determines whether a clockwise rotation operation on the controller wheel 204 has been received. If it is determined that the clockwise rotation operation has been received (YES in step S902), the system control unit 101 advances the processing to step S903, and, if not so (NO in step S902), the system control unit 101 advances the processing to step S907.

In step S903, the system control unit 101 determines whether an item indicating the illumination direction (i.e., the item 615a) is present on a curve of the range of movement (on the circumference of the item 615). For example, the positions B, C, D, and E illustrated in FIG. 7 indicate that the item 615a is present on the curve. If it is determined that the item 615a is present on the curve (YES in step S903), the system control unit 101 advances the processing to step S904, and, if not so (NO in step S903), the system control unit 101 advances the processing to step S905. Furthermore, instead of making a determination about the position of the item 615a, the system control unit 101 can determine whether the illumination direction which is currently set is the end of a range available for illumination (the position of a boundary).

Figure 11A:
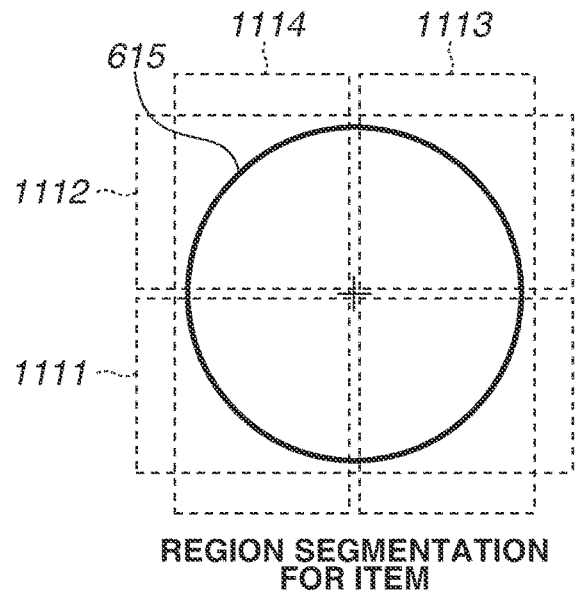
FIGS. 11A, 11B, 11C, 11D, 11E, 11F, 11G, 11H, and 11I are diagrams used to explain displays indicating directions of virtual light sources in the present exemplary embodiment.

In step S904, the system control unit 101 determines whether the item 615a is present within a lower half region of the entire range of movement. The lower half region of the entire range of movement as stated herein represents a region indicated by a region 1111 illustrated in FIG. 11A. If it is determined that the item 615a is present within the lower half region (YES in step S904), the system control unit 101 advances the processing to step S918, and, if not so (NO in step S904), the system control unit 101 advances the processing to step S905.

Figures 11B, 11C, 11D, 11E:
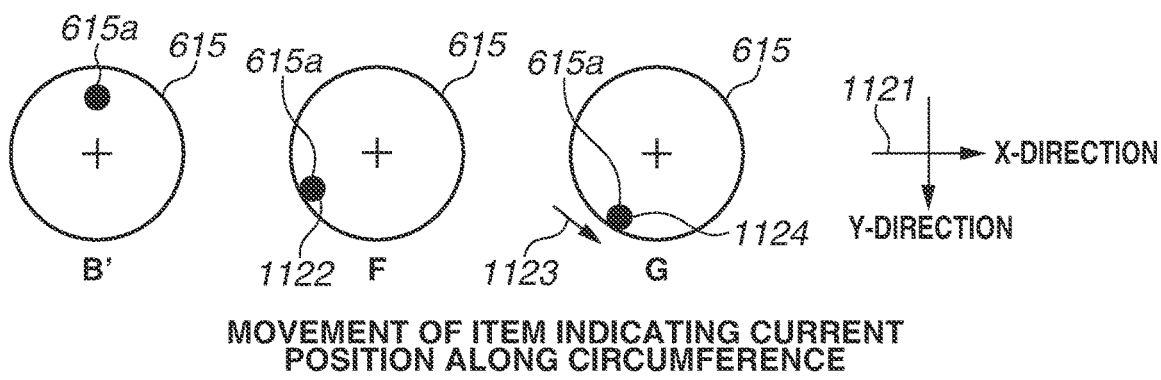

In the present exemplary embodiment, in a case where, when the rotary member has been operated, the item 615a is present on the curve in the movement instruction direction of the range of movement, the system control unit 101 keeps the item 615a from moving. For example, suppose that, in a case where the item 615a has been present at a position F illustrated in FIG. 11C, the user rotates the controller wheel 204 clockwise in such a way as to move the item 615a to a position G illustrated in FIG. 11D. The clockwise rotation of the controller wheel 204 is an instruction for movement in the downward direction. In this case, although the user has rotated the controller wheel 204 clockwise, to move in the downward direction, the item 615a moves in the counterclockwise direction (1123) on the curve (i.e., on the circumference). Although, since the movement from the position 1122 to the position 1124 becomes a movement in the counterclockwise direction as a movement on the circumference, the movement direction of the item 615a would become opposite to the rotation in which the user has rotated the rotary member, keeping the item 615a from moving enables not giving the user a feeling of strangeness. Thus, the operability for the user becomes intuitive.

In step S905, the system control unit 101 performs processing for moving the item 615a downward by one step. For example, this movement represents the item 615a moving downward in such a way as to move from the position B illustrated in FIG. 7 to the position B' illustrated in FIG. 11B. Thus, as the controller wheel 204 is rotated clockwise, the item 615a moves downward (in other words, in the plus direction of the Y-direction component illustrated in FIG. 11E).

In step S906, the system control unit 101 performs image processing in which the effect of changing the illumination direction of the virtual light source according to the user operation has been reflected. In a case where the user has rotated the controller wheel 204 clockwise, the item 615a moves downward, so that the illumination direction moves downward.

In step S907, the system control unit 101 determines whether a counterclockwise rotation operation on the controller wheel 204 has been received. If it is determined that the counterclockwise rotation operation has been received (YES in step S907), the system control unit 101 advances the processing to step S908, and, if not so (NO in step S907), the system control unit 101 advances the processing to step S911.

In step S908, the system control unit 101 determines whether the item 615a is present on the curve of the range of movement (on the circumference of the item 615). If it is determined that the item 615a is present on the curve (YES in step S908), the system control unit 101 advances the processing to step S909, and, if not so (NO in step S908), the system control unit 101 advances the processing to step S910.

In step S909, the system control unit 101 determines whether the item 615a is present within an upper half region of the entire range of movement. The upper half region of the entire range of movement as stated herein represents a region indicated by a region 1112 illustrated in FIG. 11A. If it is determined that the item 615a is present within the upper half region (YES in step S909), the system control unit 101 advances the processing to step S918, and, if not so (NO in step S909), the system control unit 101 advances the processing to step S910.

In step S910, the system control unit 101 performs processing for moving the item 615a upward by one step.

In step S911, the system control unit 101 determines whether a clockwise rotation operation on the electronic dial 205 has been received. If it is determined that the clockwise rotation operation has been received (YES in step S911), the system control unit 101 advances the processing to step S912, and, if not so (NO in step S911), the system control unit 101 advances the processing to step S915.

In step S912, the system control unit 101 determines whether the item 615a is present on the curve of the range of movement (on the circumference of the item 615). If it is determined that the item 615a is present on the curve (YES in step S912), the system control unit 101 advances the processing to step S913, and, if not so (NO in step S912), the system control unit 101 advances the processing to step S914.

In step S913, the system control unit 101 determines whether the item 615a is present within a right half region of the entire range of movement. The right half region of the entire range of movement as stated herein represents a region indicated by a region 1113 illustrated in FIG. 11A. If it is determined that the item 615a is present within the right half region (YES in step S913), the system control unit 101 advances the processing to step S918, and, if not so (NO in step S913), the system control unit 101 advances the processing to step S914.

In step S914, the system control unit 101 performs processing for moving the item 615a rightward by one step.

In step S915, the system control unit 101 determines whether the item 615a is present on the curve of the range of movement (on the circumference of the item 615). If it is determined that the item 615a is present on the curve (YES in step S915), the system control unit 101 advances the processing to step S916, and, if not so (NO in step S915), the system control unit 101 advances the processing to step S917. Since a result of determination in step S911 is NO, processing in steps S915 to S917 is processing which is performed when the electronic dial 205 has been rotated counterclockwise.

In step S916, the system control unit 101 determines whether the item 615a is present within a left half region of the entire range of movement. The left half region of the entire range of movement as stated herein represents a region indicated by a region 1114 illustrated in FIG. 11A. If it is determined that the item 615a is present within the left half region (YES in step S916), the system control unit 101 advances the processing to step S918, and, if not so (NO in step S916), the system control unit 101 advances the processing to step S917.

In step S917, the system control unit 101 performs processing for moving the item 615a leftward by one step. Furthermore, while, in the present exemplary embodiment, the rotation by a predetermined amount of the rotary member leads to moving the item 615a by one step, such one step represents a movement amount equivalent to an angle of, for example, 5 degrees or 10 degrees with respect to the illumination direction.

In step S918, the system control unit 101 starts measuring the display count T as with step S508 illustrated in FIG. 5.

In step S919, the system control unit 101 determines whether the display count T has exceeded 2 seconds as with step S509 illustrated in FIG. 5. If it is determined that the display count T has exceeded 2 seconds (YES in step S919), the system control unit 101 advances the processing to step S920, in which the system control unit 101 re-displays the item 615. If it is determined that the display count T has not yet exceeded 2 seconds (NO in step S919), the system control unit 101 advances the processing to step S921.

In step S921, the system control unit 101 determines whether the rotary member operation has been detected again, and, if it is determined that the rotary member operation has been detected again (YES in step S921), the system control unit 101 returns the processing to step S902, and, if not so (NO in step S921), the system control unit 101 returns the processing to step S919.

Figure 10A:
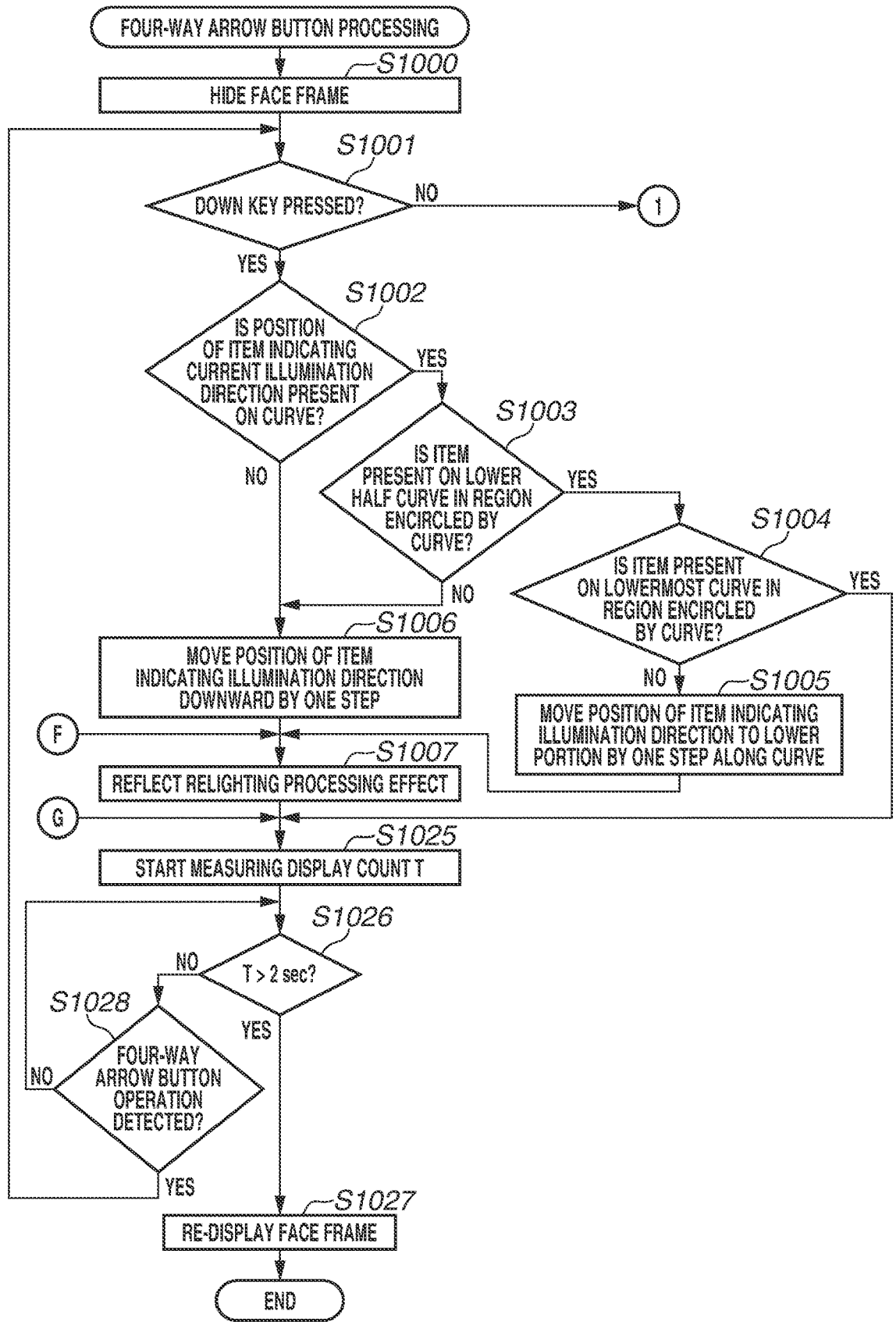
FIGS. 10A, 10B, and 10C are flowcharts illustrating processing for a four-way arrow button operation in the present exemplary embodiment.
Figure 10B:
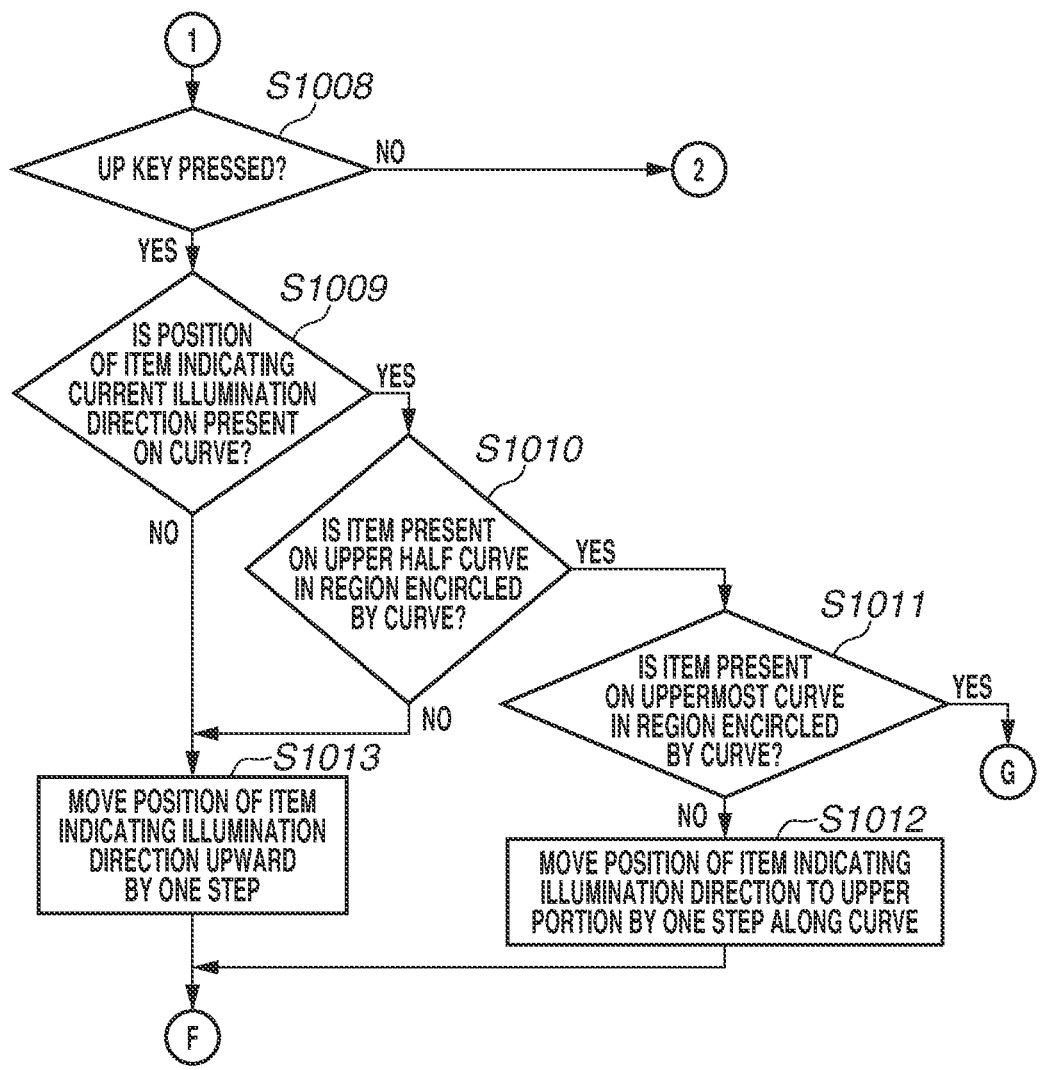
Figure 10C:
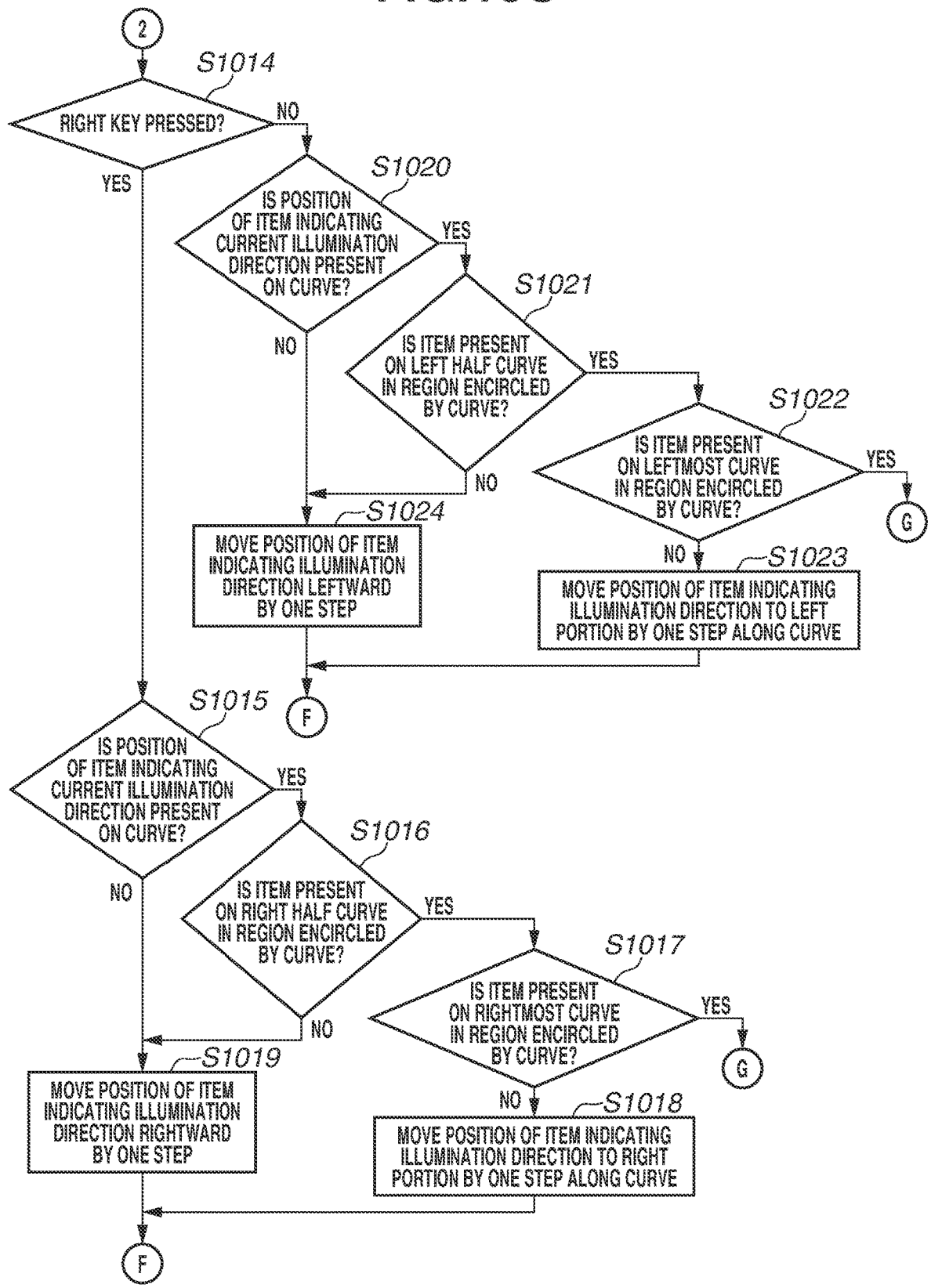

Next, four-way arrow button operation processing in the present exemplary embodiment is described with reference to FIGS. 10A, 10B, and 10C. This processing is implemented by the system control unit 101 loading a program recorded on the non-volatile memory 114 onto the system memory 112 and executing the loaded program. Processing illustrated in FIGS. 10A, 10B, and 10C is started when the system control unit 101 advances the processing to step S318 illustrated in FIG. 3B.

In step S1000, the system control unit 101 hides the item 616, which indicates a face which is currently selected, as with step S501 illustrated in FIG. 5. Even with a touch operation described with reference to FIG. 5 or an operation member using four-way arrow buttons or a rotary member, an item which indicates a face which is currently selected is hidden in response to an instruction for changing the illumination direction of the virtual light source being issued, so that the effect of illumination becomes easily recognizable.

In step S1001, the system control unit 101 determines whether the down key 202b of the four-way arrow buttons 202 has been pressed. If it is determined that the down key 202b has been pressed (YES in step S1001), the system control unit 101 advances the processing to step S1002, and, if not so (NO in step S1001), the system control unit 101 advances the processing to step S1008.

In step S1002, the system control unit 101 determines whether an item indicating the illumination direction (i.e., the item 615a) is present on a curve of the range of movement (on the circumference of the item 615), as with step S903 illustrated in FIG. 9A. If it is determined that the item 615a is present on the curve (YES in step S1002), the system control unit 101 advances the processing to step S1003, and, if not so (NO in step S1002), the system control unit 101 advances the processing to step S1006.

In step S1003, the system control unit 101 determines whether the item 615a is present within a lower half region of the entire range of movement, as with step S904 illustrated in FIG. 9A. If it is determined that the item 615a is present within the lower half region (YES in step S1003), the system control unit 101 advances the processing to step S1004, and, if not so (NO in step S1003), the system control unit 101 advances the processing to step S1006.

In step S1004, the system control unit 101 determines whether the item 615a is present at the lowermost portion of the range of movement (on the curve). In other words, the system control unit 101 determines whether the item 615a is present at a position from where the item 615a is not able to move downward any more. This corresponds to the state D illustrated in FIG. 7. If it is determined that the item 615a is present at the lowermost portion of the range of movement (YES in step S1004), the system control unit 101 advances the processing to step S1025, and, if not so (NO in step S1004), the system control unit 101 advances the processing to step S1005.

In step S1005, the system control unit 101 moves the item 615a to a lower portion by one step along the curve of the range of movement. Thus, while the movement distance of the item 615a becomes larger than one step, the item 615a moves on the curve in such a way as to change the coordinates thereof by one step in the plus direction of the Y-direction component illustrated in FIG. 11E.

In step S1006, the system control unit 101 performs processing for moving the item 615a downward by one step, as with step S905 illustrated in FIG. 9A.

In step S1007, the system control unit 101 performs image processing in which the effect of changing the illumination direction of the virtual light source according to the user operation has been reflected, as with step S906 illustrated in FIG. 9A.

In step S1008, the system control unit 101 determines whether the up key 202a of the four-way arrow buttons 202 has been pressed. If it is determined that the up key 202a has been pressed (YES in step S1008), the system control unit 101 advances the processing to step S1009, and, if not so (NO in step S1008), the system control unit 101 advances the processing to step S1014.

In step S1009, the system control unit 101 determines whether an item indicating the illumination direction (i.e., the item 615a) is present on a curve of the range of movement (on the circumference of the item 615), as with step S903 illustrated in FIG. 9A. If it is determined that the item 615a is present on the curve (YES in step S1009), the system control unit 101 advances the processing to step S1010, and, if not so (NO in step S1009), the system control unit 101 advances the processing to step S1013.

In step S1010, the system control unit 101 determines whether the item 615a is present within an upper half region of the entire range of movement, as with step S909 illustrated in FIG. 9A. If it is determined that the item 615a is present within the upper half region (YES in step S1010), the system control unit 101 advances the processing to step S1011, and, if not so (NO in step S1010), the system control unit 101 advances the processing to step S1013.

In step S1011, the system control unit 101 determines whether the item 615a is present at the uppermost portion of the range of movement (on the curve). In other words, the system control unit 101 determines whether the item 615a is present at a position from where the item 615a is not able to move upward any more. This corresponds to the state B illustrated in FIG. 7. If it is determined that the item 615*a* is present at the uppermost portion of the range of movement (YES in step S1011), the system control unit 101 advances the processing to step S1025, and, if not so (NO in step S1011), the system control unit 101 advances the processing to step S1012.

In step S1012, the system control unit 101 moves the item 615*a* to an upper portion by one step along the curve of the range of movement. Thus, while the movement distance of the item 615*a* becomes larger than one step, the item 615*a* moves on the curve in such a way as to change the coordinates thereof by one step in the minus direction of the Y-direction component illustrated in FIG. 11E.

In step S1013, the system control unit 101 performs processing for moving the item 615*a* upward by one step.

In step S1014, the system control unit 101 determines whether the right key 202*d* of the four-way arrow buttons 202 has been pressed. If it is determined that the right key 202*d* has been pressed (YES in step S1014), the system control unit 101 advances the processing to step S1015, and, if not so (NO in step S1014), the system control unit 101 advances the processing to step S1020.

In step S1015, the system control unit 101 determines whether an item indicating the illumination direction (i.e., the item 615*a*) is present on a curve of the range of movement (on the circumference of the item 615), as with step S903 illustrated in FIG. 9A. If it is determined that the item 615*a* is present on the curve (YES in step S1015), the system control unit 101 advances the processing to step S1016, and, if not so (NO in step S1015), the system control unit 101 advances the processing to step S1019.

In step S1016, the system control unit 101 determines whether the item 615*a* is present within a right half region of the entire range of movement, as with step S913 illustrated in FIG. 9B. If it is determined that the item 615*a* is present within the right half region (YES in step S1016), the system control unit 101 advances the processing to step S1017, and, if not so (NO in step S1016), the system control unit 101 advances the processing to step S1019.

In step S1017, the system control unit 101 determines whether the item 615*a* is present at the rightmost portion (right end) of the range of movement (on the curve). In other words, the system control unit 101 determines whether the item 615*a* is present at a position from where the item 615*a* is not able to move rightward any more. This corresponds to the state C illustrated in FIG. 7. If it is determined that the item 615*a* is present at the rightmost portion of the range of movement (YES in step S1017), the system control unit 101 advances the processing to step S1025, and, if not so (NO in step S1017), the system control unit 101 advances the processing to step S1018.

In step S1018, the system control unit 101 moves the item 615*a* to a right portion by one step along the curve of the range of movement. Thus, while the movement distance of the item 615*a* becomes larger than one step, the item 615*a* moves on the curve in such a way as to change the coordinates thereof by one step in the plus direction of the X-direction component illustrated in FIG. 11E.

In step S1019, the system control unit 101 performs processing for moving the item 615*a* rightward by one step, as with step S914 illustrated in FIG. 9B.

In step S1020, the system control unit 101 determines whether an item indicating the illumination direction (i.e., the item 615*a*) is present on a curve of the range of movement (on the circumference of the item 615), as with step S903 illustrated in FIG. 9A. If it is determined that the item 615*a* is present on the curve (YES in step S1020), the system control unit 101 advances the processing to step S1021, and, if not so (NO in step S1020), the system control unit 101 advances the processing to step S1024.

In step S1021, the system control unit 101 determines whether the item 615*a* is present within a left half region of the entire range of movement, as with step S916 illustrated in FIG. 9B. If it is determined that the item 615*a* is present within the left half region (YES in step S1021), the system control unit 101 advances the processing to step S1022, and, if not so (NO in step S1021), the system control unit 101 advances the processing to step S1024.

In step S1022, the system control unit 101 determines whether the item 615*a* is present at the leftmost portion (left end) of the range of movement (on the curve). In other words, the system control unit 101 determines whether the item 615*a* is present at a position from where the item 615*a* is not able to move leftward any more. This corresponds to the state E illustrated in FIG. 7. If it is determined that the item 615*a* is present at the leftmost portion of the range of movement (YES in step S1022), the system control unit 101 advances the processing to step S1025, and, if not so (NO in step S1022), the system control unit 101 advances the processing to step S1023.

In step S1023, the system control unit 101 moves the item 615*a* to a left portion by one step along the curve of the range of movement. Thus, while the movement distance of the item 615*a* becomes larger than one step, the item 615*a* moves on the curve in such a way as to change the coordinates thereof by one step in the minus direction of the X-direction component illustrated in FIG. 11E.

In step S1024, the system control unit 101 performs processing for moving the item 615*a* leftward by one step, as with step S917 illustrated in FIG. 9B.

Processing in steps S1025 to S1027 is processing similar to that in steps S918 to S920 illustrated in FIG. 9A.

In step S1028, the system control unit 101 determines whether the four-way arrow button operation has been detected again, and, if it is determined that the four-way arrow button operation has been detected again (YES in step S1028), the system control unit 101 returns the processing to step S1001 and, if not so (NO in step S1028), the system control unit 101 returns the processing to step S1026.

Figures 11F, 11G, 11H, 11I:
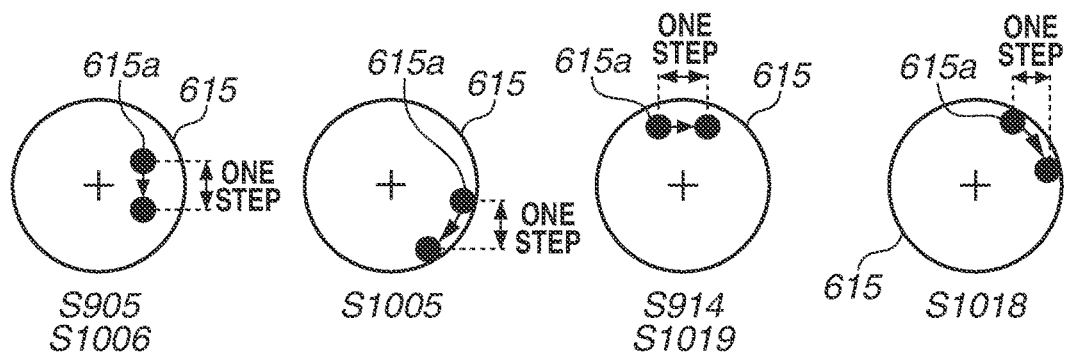

Movement of the item 615*a* occurring when the four-way arrow buttons 202 (or the multi-controller 208) or the rotary operation member has been operated is described with reference to FIGS. 11F to 11I. FIGS. 11F to 11I illustrate states of the item 615*a* displayed before and after the movement thereof. When the down key 202*b* of the four-way arrow buttons 202 (or downward motion of the multi-controller 208) is operated, the item 615*a* moves as illustrated in FIG. 11F. At this time, even when the controller wheel 204 is rotated clockwise, the item 615*a* moves as illustrated in FIG. 11F. On the other hand, as illustrated in FIG. 11G, in a case where the item 615*a* displayed before the movement thereof is present on the curve of the range of movement, when the down key 202*b* of the four-way arrow buttons 202 is operated, the item 615*a* moves along the curve.

Similarly, when the right key 202*d* of the four-way arrow buttons 202 is operated, the item 615*a* moves as illustrated in FIG. 11H. At this time, even when the electronic dial 205 is rotated clockwise, the item 615*a* moves as illustrated in FIG. 11H. In a case where the item 615*a* is present on the curve of the range of movement, when the right key 202*d* of the four-way arrow buttons 202 is operated, the item 615*a* moves along the curve as illustrated in FIG. 11I.

In a case where the controller wheel 204 or the electronic dial 205 is rotationally operated, when the item 615a is present on the curve (boundary) of the range of movement, the item 615a does not move.

As mentioned above, in the present exemplary embodiment, an operation on the four-way arrow buttons 202 or the multi-controller 208 allows the item 615a to move along the curve. Since the four-way arrow buttons 202 or the multi-controller 208 is not a rotary member, a direction for which an instruction is issued with respect to movement coincides with a direction of operation. Therefore, unless the item 615a moves in a direction opposite to the direction of operation, without having to move only in the direction of operation, as long as the item 615a moves toward the direction of operation, a feeling of strangeness is unlikely to be given to the user. Thus, in a case where the user has issued an instruction for rightward movement, unless the item 615a moves in the minus direction of the X-direction component, as long as, even if the item 615a moves somewhat in the Y-direction, the item 615a moves in the plus direction of the X-direction component, the user is able to recognize that the direction of operation and the movement direction of the item 615a coincide with each other. As long as the direction of operation and the movement direction of the item 615a coincide with each other, the user is able to recognize that the item 615a is moving based on the direction of operation, thus being able to perform an intuitive operation. On the other hand, if, although the user has issued an instruction for rightward movement, the item 615a does not move in the plus direction of the X-direction component but moves only along the Y-direction or moves in the minus direction of the X-direction component, there is a high possibility that the user feels as if the item 615a is not moving based on the direction of operation. In this way, changing movement processing for the item 615a between a rotary operation member and an operation member in which a direction of operation coincides with a direction for which an instruction is issued with respect to movement enables the user to perform an operation with high operability even when operating any of the operation members.

Furthermore, with regard to the four-way arrow button operation processing, an operation member used for such processing is not limited to four-way arrow buttons, and, for example, similar processing can be performed by using a single member which enables performing operations in a plurality of component directions, such as a joystick.

Moreover, in the present exemplary embodiment, only the controller wheel 204 and the electronic dial 205 have been mentioned as rotary members. The present exemplary embodiment is not limited to this, and the above-mentioned processing (processing in which, even if the user operates a rotary member when the item 615a is present on the curve, the item 615a is prevented from moving on and along the curve) can be performed by using every rotary member located in such a position that the display plane for the item 615a and the rotation axis of the rotary member are perpendicular to each other. Performing such control has the effect of being able to provide the user with an operation with no feeling of strangeness.

Each of the controller wheel 204 and the electronic dial 205 is able to be used to issue an instruction for movement along one axis, and the Y-axis direction, which is the movement direction of the controller wheel 204, is perpendicular to the X-axis direction, which is the movement direction of the electronic dial 205. Therefore, if, although the item 615a has been moved in the X-axis direction, the item 615a is also moved in the Y-axis direction, which is a direction for movement which is able to be caused by the other operation member, there is a possibility that the user becomes unable to understand which operation member to use to move the item 615a along which direction. On the other hand, in a case where instructions for movement along two axes are able to be issued by a single operation member, such as the four-way arrow buttons 202 or the multi-controller 208, instructions for movement in both the X-axis direction and the Y-axis direction are able to be issued by the same operation member. Therefore, as long as the item 615a moves at least in a direction designated by an instruction, the possibility of giving the user a feeling of strangeness is low. In this way, changing movement control according to which movement instruction for one axis or two axes an operation member is able to be used to issue improves the operability of the user. As long as a region formed along (surrounded by) the X-axis along which an instruction for movement is able to be issued by an operation on an operation member and an axis different from the Y-axis perpendicular to the X-axis is used, even if not with regard to movement in a circle, processing illustrated in FIGS. 9A and 9B and FIGS. 10A to 10C is applicable. Thus, even with regard to movement in a rhomboid or an ellipse, such processing is applicable.

As described above, according to an advantageous effect of the present exemplary embodiment, when a touch operation is performed to change the illumination direction of the virtual light source, the finger of the user which is performing the touch operation does not cover a face which is currently selected, so that operability does not decrease. Moreover, since the item 615 which enables knowing the direction of the virtual light source with respect to a subject which is currently selected is displayed, even when the user is performing a touch operation in a relative manner, the user is able to know the current illumination direction. Therefore, the user is enabled to perform an operation for changing the illumination direction by a touch operation with good operability.

As described above, according to an advantageous effect of the present exemplary embodiment, the user becomes able to easily understand the effect of the virtual light source and also able to recognize a subject which is currently selected.

As described above, according to an advantageous effect of the present exemplary embodiment, in the case of changing the illumination direction of the virtual light source by a rotary operation member, the user is able to perform an intuitive operation.

Next, a modification example of advanced setting displaying performed in step S301 illustrated in FIG. 3A is described with reference to the flowchart of FIG. 12 and screen display examples illustrated in FIGS. 13A, 13B, 13C, 13D, and 13E. Displaying other than the advanced setting displaying is similar to that in the exemplary embodiment described with reference to FIGS. 1A and 1B to FIGS. 11A to 11I. However, while, in the modification example, for ease of explanation, the item 615 is not displayed and the virtual light source is displayed directly in superimposition on an image (as a virtual light source 1304), the item 615 can also be displayed.

Figure 12:
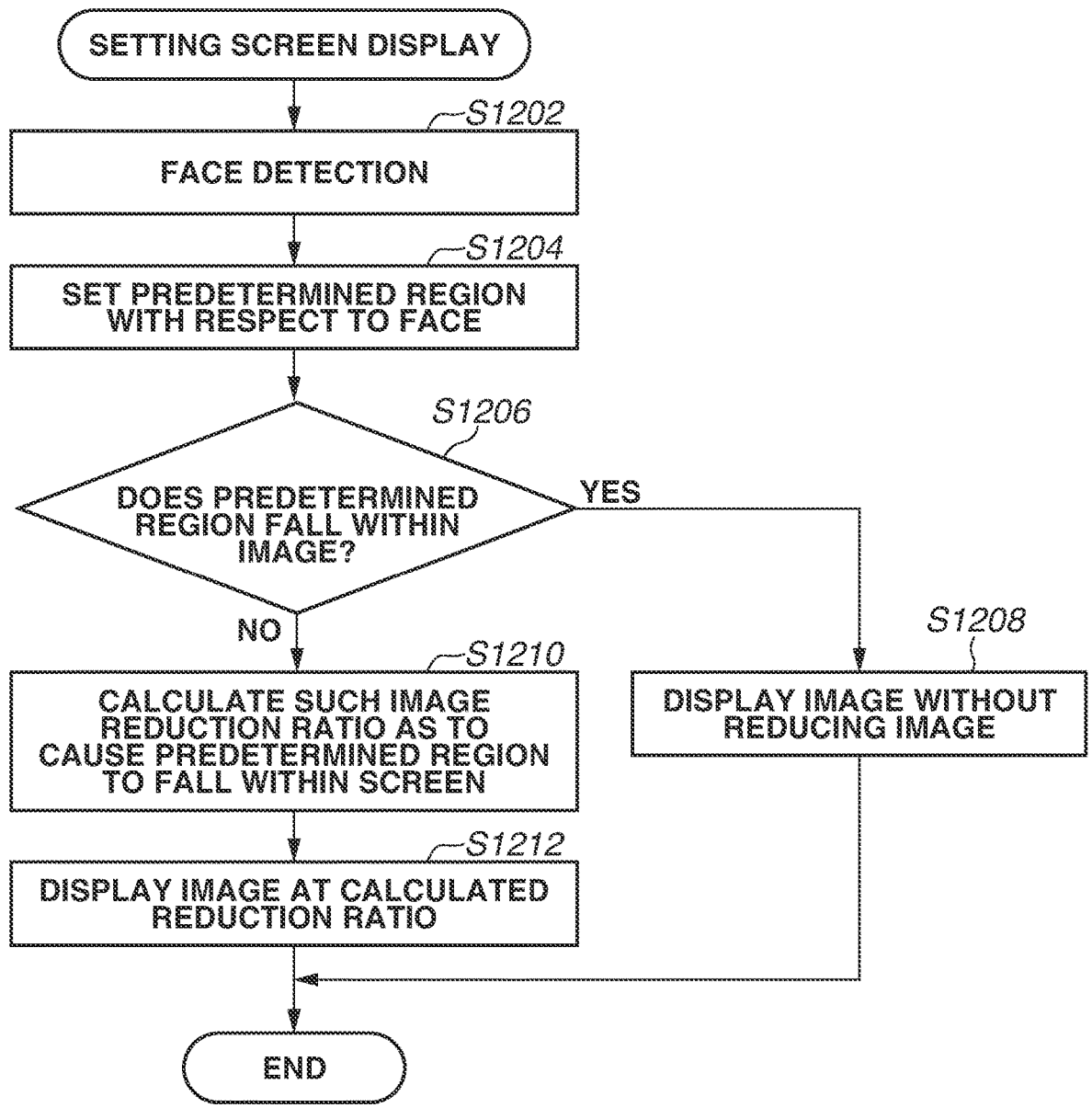
FIG. 12 is a flowchart illustrating a modification example of processing which is performed to display a setting screen.

FIG. 12 is a flowchart illustrating a modification example of advanced setting displaying included in the processing performed in step S301.

In step S1202, the system control unit 101 detects a face included in the selected image. In a case where there is a plurality of faces, the system control unit 101 detects the plurality of faces.

FIGS. 13A to 13E illustrate screen display examples obtained when display processing for the advanced setting screen is performed.

Figure 13C:
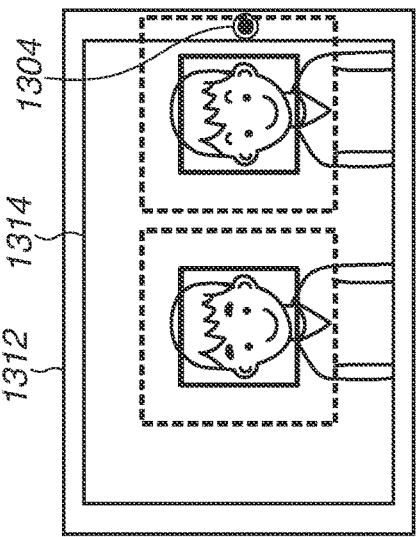
FIGS. 13A, 13B, 13C, 13D, and 13E are diagrams illustrating modification examples of setting screens.
Figure 13B:
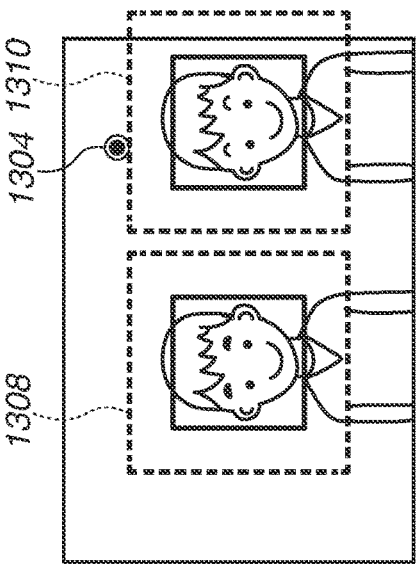
Figure 13E:
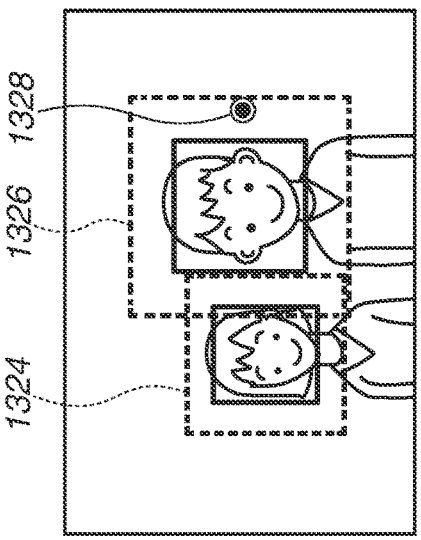
Figure 13A:
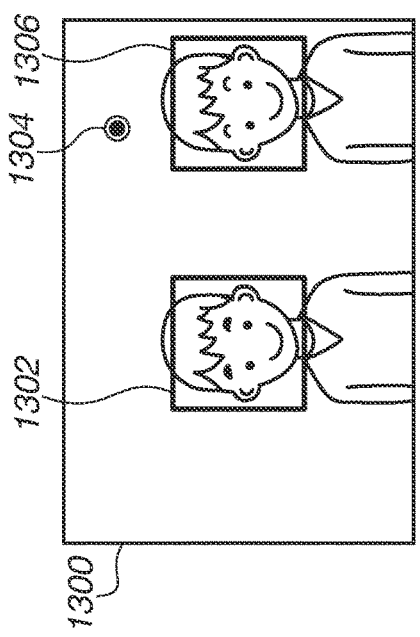

FIG. 13A illustrates the state in which faces included in an image 1300 (a captured image) are detected. Thus, FIG. 13A illustrates the state in which a face 1302 and a face 1306 have been detected. Moreover, FIG. 13A also illustrates the state in which a virtual light source 1304 is displayed in superimposition on the image 1300. The virtual light source 1304 is an item which indicates a direction of application of a light source when processing for causing such an effect as to apply a light source to a selected face. Moreover, the virtual light source 1304 is able to be moved with respect to relative positions according to a touch operation performed by the user. Alternatively, the virtual light source 1304 is able to be moved by using the four-way arrow buttons 202 or a rotary operation member. Movement of the virtual light source is similar to that described with reference to FIG. 5, FIGS. 9A and 9B, and FIGS. 10A to 10C.

In step S1204, the system control unit 101 sets, with respect to the detected face, a region with a predetermined width or more surrounding the detected face.

FIG. 13B illustrates the state in which, with respect to each of the detected faces, a region with a predetermined width or more surrounding the face is set.

The region with a predetermined width or more surrounding the face is a region in which, in a case where a distance between the virtual light source and the face region is set away from a predetermined value or more, there becomes no change in the effect. In other words, the region with a predetermined width or more surrounding the face is a region obtained by expanding a region in which the face has been recognized by a predetermined width, and indicates a region in which there is a predetermined degree or more of effect caused by the virtual light source with respect to the face. The predetermined degree or more of effect is an effect which enables recognizing application of a virtual light source on the display screen, and the position away from the virtual light source to such an extent as to be able to cause the predetermined degree or more of effect becomes the predetermined width. Therefore, even if the same face is selected, when the user changes the range of the virtual light source or changes the brightness thereof, the width mentioned in step S1204 changes. Since it is unlikely that the virtual light source is located at a position away from the face region to such an extent that the effect of image processing performed on the face becomes unrecognizable, the predetermined width is provided and operability is improved while the reduction ratio of an image is prevented from becoming small and the visibility of a subject is prevented from decreasing. In other words, while, in a case where a subject which is able to be selected is located at a central region of the display unit 111 (display screen), the image is displayed without being reduced, in a case where the subject is not located at the central region, the image is displayed while being reduced.

In the modification example, when the length from the center of the area in which the face has been recognized to the end of the region is set to "1", the predetermined width is assumed to be "0.7" in length. In a case where the predetermined width is too small with respect to the face region, when the image is displayed on a small display unit such as the display unit 111 of the digital camera 100 or when the face is located at the end of the image, if a touch operation is performed, the virtual light source overlaps the face, so that the effect on the face may become hard to recognize. Moreover, in a case where the predetermined width is too large with respect to the face region, a reduction ratio described below becomes large, so that the effect on the image may become hard to recognize. Therefore, in a case where there is a width with a predetermined value or more around the face, the image is not reduced.

In FIG. 13B, a region 1308 is set with respect to the face 1302, and a region 1310 is set with respect to the face 1306. In a case where a plurality of faces has been detected, a region is set with respect to each face.

The shape of the region with a predetermined width or more surrounding the face is set to a shape obtained by taking into account a detection region for the image. While, in FIGS. 13A to 13E, since the detection region for the image is square, the region with a predetermined width or more surrounding the face is a square-shaped region, in a case where the detection region for the image is circular, the region with a predetermined width or more surrounding the face can be a circular-shaped region.

In step S1206, the system control unit 101 determines whether the region set in step S1204 falls within the display range of the display unit 111. In a case where there is a plurality of regions set in step S1204, the system control unit 101 determines whether the plurality of regions fall within the display range of the display unit 111. If it is determined that the region set in step S1204 falls within the display range of the display unit 111 (YES in step S1206), the system control unit 101 advances the processing to step S1208, and, if not so (NO in step S1206), the system control unit 101 advances the processing to step S1210.

In the example illustrated in FIG. 13B, it is determined that the region 1310 does not fall within the display range of the display unit 111.

If, in step S1206, it is determined that the region set in step S1204 does not fall within the display range of the display unit 111, then in step S1210, the system control unit 101 calculates a reduction ratio used for displaying the image while reducing the image in such a manner that the region set in step S1204 falls within the display range of the display unit 111. Thus, as the face is closer to the end of the display unit 111 or the face is larger, the reduction ratio becomes larger, so that the image is displayed in a smaller size.

In step S1212, the system control unit 101 displays, on the display unit 111, the image in a size that is based on the reduction ratio calculated in step S1210.

Furthermore, while, in the description of step S1206, the system control unit 101 performs a determination with respect to all of the plurality of faces, the present modification example is not limited to this, and the system control unit 101 can perform a determination with respect to only a face which is currently selected. If the system control unit 101 performs a determination with respect to only a face which is currently selected, the reduction ratio becomes small and the visibility of the image increases. If the system control unit 101 performs a determination with respect to all of the faces, since, even if a face which is selected is changed, the display size of the image does not change, it is possible to continue an operation for image processing with the same size, which is thus favorable. Moreover, the reduction ratio can be set fixed irrespective of the position or size of a subject.

FIG. 13C illustrates the state in which an image 1314 obtained by reducing the image 1300 is displayed in a display region 1312, which is displayed on the display unit 111. In a case where, as illustrated in FIG. 13B, the region 1310 does not fall within the range of the display unit 111, the image is displayed while being reduced. The image 1314, which is obtained by reducing the image 1300 at a reduction ratio calculated in such a manner that the region 1310 falls within the display region 1312 of the display unit 111, is displayed. Since the image is displayed while being reduced, the virtual light source 1304 becomes able to be located on the right side of the face 1306.

If, in step S1206, it is determined that the region set in step S1204 falls within the display range of the display unit 111, then in step S1208, the system control unit 101 displays the image without reducing the image as with step S1212. Thus, even if being the same image, the image is displayed in a larger size in step S1208 than in step S1212.

Figure 13D:
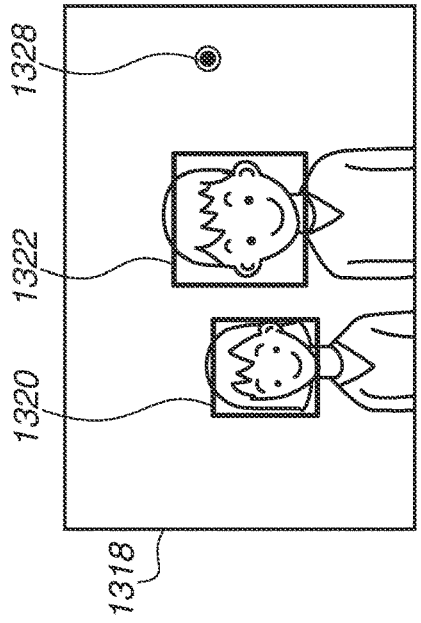

FIG. 13D illustrates the state in which faces included in an image 1318 are detected. Thus, FIG. 13D illustrates the state in which a face 1320 and a face 1322 have been detected. Moreover, FIG. 13D also illustrates the state in which a virtual light source 1328 is displayed in superimposition on the image 1318.

FIG. 13E illustrates the state in which, with respect to each detected face, a region with a predetermined width or more surrounding the detected face is set. A region 1324 is set with respect to the face 1320, and a region 1326 is set with respect to the face 1322. In FIG. 13E, since each of the region 1324 and the region 1326 falls within the display region of the display unit 111, the image 1318 is displayed without being reduced. Since, without the need to reduce the image, a virtual light source 1328 is able to be located on the right side of the face 1322 or at a position in another direction, the user is enabled to perform processing for changing the direction of the virtual light source with good operability.

As described above, according to the modification example, whether to display an image while reducing the image or display an image without reducing the image is controlled based on information calculated from the position of a face. With this control, even in a case where a face is located at the end of the screen and the user wants to move a virtual light source to outside the screen, it becomes easy to move the virtual light source.

Furthermore, on condition that a face is located in a region at the end of an image (is not located in a central region) (without taking into account a predetermined region mentioned in step S1206), the image can be displayed while being reduced, or a determination in step S1206 can be performed with respect to only a face which is currently selected. Moreover, with regard to an operation on a virtual light source, even in the case of moving the virtual light source with an absolute position according to a touch operation performed by the user, a similar advantageous effect is able to be attained. Even in the case of a movement using an absolute position for moving the virtual light source to a position touched by the user, reducing and displaying an image in such a manner that a region is provided around a face enables improving the operability for the user.

Moreover, a target for a virtual light source can be, in addition to the face of a person, such a subject as an animal, a vehicle, or a building.

Additionally, the present exemplary embodiment and the modification example can be applied to, in addition to the illumination direction of a virtual light source, the case of selecting two points, i.e., a previously selected position and a position to be used for performing predetermined processing. For example, the present exemplary embodiment and the modification example can also be applied to a case where, when, with respect to a subject located at a previously selected position, a position different from the previously selected position is selected, an image effect in which the subject appears to be flowing or such an effect as to extend the subject is applied to the subject from the different position. Both in the case of changing the illumination direction of a virtual light source and in the case of selecting a position different from the position of a subject which is currently selected to apply an image effect, the item 615 represents a positional relationship between a subject which is currently selected and an imaginary position.

While, in the description of the present exemplary embodiment, an item indicating the illumination direction of a virtual light source moves within a circle, this is merely an example, and the item can move within a rhomboid or an ellipse.

While, in the present exemplary embodiment, illumination of a virtual light source has been described as an example, the present exemplary embodiment is not limited to this, and can also be applied to the case of performing such editing as to change colors in an image or change the location or size of a subject in an image. Besides, the present exemplary embodiment can also be applied to not only a still image but also a moving image. While, in the present exemplary embodiment, a description has been made with respect to only an image with depth information appended thereto, the present exemplary embodiment is not limited to this.

Furthermore, the above-mentioned various control operations described as operations which are performed by the system control unit 101 can be performed by a single piece of hardware, or control operations on the entire apparatus can be performed by a plurality of pieces of hardware sharing the processing operations.

Moreover, while the present disclosure includes exemplary embodiments, the present disclosure is not limited to a specific exemplary embodiment, and various aspects within a range not departing from the gist of the present disclosure are also included in the present disclosure. Additionally, the above-described exemplary embodiments merely represent exemplary embodiments of the present disclosure, and various exemplary embodiments can be combined as appropriate.

Moreover, while, in the above-described exemplary embodiment, the digital camera 100 has been described as an example, the above-described exemplary embodiment is not limited to this example, but the present disclosure can also be applied to such a display control apparatus as to be capable of performing control about image processing. Thus, the present disclosure includes, for example, a mobile phone terminal, a portable image viewer, a personal computer (PC), a printer apparatus equipped with an electronic viewfinder, a home electrical appliance having a display unit, a digital photo-frame, a projector, a tablet PC, a music player, a game machine, and an electronic book reader.

Embodiments of the present disclosure can also be implemented by performing the following processing. Specifically, the processing supplies software (program) for implementing the functions of the above-described exemplary embodiment to a system or apparatus via a network or various types of storage media, and causes a computer (or a central processing unit (CPU) or a micro processing unit (MPU)) of the system or apparatus to read out and execute program code. In this case, the program and a storage medium storing the program are included in the present disclosure.

According to exemplary embodiments of the present disclosure, the user is enabled to easily recognize a subject to which an image effect is to be applied.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-217581, filed Nov. 29, 2019, which is hereby incorporated by reference herein in its entirety.

What is claimed is:

1. A display control apparatus comprising:
at least one processor and/or circuit configured to function as:
- a change unit configured to change amount of application of a predetermined effect which is to be applied to a selected subject from a plurality of selectable subjects; and
- a control unit configured to perform control to display a first item which makes the selected subject distinguishable from other subjects, together with the selected subject and subjects not selected from the plurality of selectable subjects,
wherein, in a state where the first item is displayed, in response to the change unit starting changing the amount of application of the predetermined effect, the control unit performs control to hide the first item and to display both of the selected subject and the subjects not selected from the plurality of selectable subjects.

2. The display control apparatus according to claim 1, wherein the control unit performs control to display the selected subject in such a way as to be distinguishable from the subjects not selected from the plurality of selectable subjects by displaying the first item in superimposition on the selected subject.

3. The display control apparatus according to claim 1, the at least one processor and/or circuit further configured to function as:
- a touch detection unit configured to detect a touch operation on a display surface,
wherein, in response to the touch detection unit having detected movement of a position of the touch operation, the control unit performs control not to display the selected subject in such a way as to be distinguishable from the subjects not selected from the plurality of selectable subjects.

4. The display control apparatus according to claim 1, wherein the predetermined effect is an effect in which illumination from a virtual light source is performed onto the selected subject, and the change unit is able to change a direction of illumination from the virtual light source.

5. The display control apparatus according to claim 1, wherein, in response to the change unit ending changing the amount of application of the predetermined effect, the control unit performs control to display the selected subject in such a way as to be distinguishable from the subjects not selected from the plurality of selectable subjects.

6. The display control apparatus according to claim 1, wherein, in response to the change unit changing the amount of application of the predetermined effect, the control unit performs control to update a second item which indicates amount of application of the predetermined effect and display the updated second item.

7. The display control apparatus according to claim 6, wherein, even when the change unit starts changing the amount of application of the predetermined effect, the control unit performs control to keep the second item displayed.

8. A control method for a display control apparatus, the control method comprising:
- changing amount of application of a predetermined effect which is to be applied to a selected subject from a plurality of selectable subjects;
- performing control to display a first item which makes the selected subject distinguishable from other subjects, together with the selected subject and subjects not selected from the plurality of selectable subjects; and
- in a state where the first item is displayed, in response to changing the amount of application of the predetermined effect being started, performing control to hide the first item and to display both of the selected subject and the subjects not selected from the plurality of selectable subjects.

9. A non-transitory computer-readable storage medium storing computer-executable instructions that, when executed by a computer, cause the computer to perform a control method for a display control apparatus, the control method comprising:
- changing amount of application of a predetermined effect which is to be applied to a selected subject from a plurality of selectable subjects;
- performing control to display a first item which makes the selected subject distinguishable from other subjects, together with the selected subject and subjects not selected from the plurality of selectable subjects; and
- in a state where the first item is displayed, in response to changing the amount of application of the predetermined effect being started, performing control to hide the first item and to display both of the selected subject and the subjects not selected from the plurality of selectable subjects.

* * * * *